(12) United States Patent
Zrilic

(10) Patent No.: US 6,285,306 B1
(45) Date of Patent: Sep. 4, 2001

(54) CIRCUITS AND METHODS FOR FUNCTIONAL PROCESSING OF DELTA MODULATED PULSE DENSITY STREAM

(76) Inventor: Djuro G. Zrilic, 1108 Columbia, Las Vegas, NM (US) 87701

(*) Notice: Subject to any disclaimer, the term of this patent is extended or adjusted under 35 U.S.C. 154(b) by 0 days.

(21) Appl. No.: 09/576,077

(22) Filed: Nov. 25, 1997

Related U.S. Application Data

(63) Continuation-in-part of application No. 08/594,433, filed on Jan. 31, 1996, now abandoned.

(51) Int. Cl.[7] .................................................. H03M 3/00

(52) U.S. Cl. .............................................. 341/143; 341/77

(58) Field of Search ............................... 341/143, 76, 77, 341/144; 375/247, 248

(56) References Cited

U.S. PATENT DOCUMENTS

| | | | | |
|---|---|---|---|---|
| 4,320,361 | * | 3/1982 | Kikkert | 332/16 R |
| 4,450,532 | * | 5/1984 | Massey | 364/703 |
| 4,622,649 | * | 11/1986 | Lu | 364/728 |
| 4,730,165 | * | 3/1988 | Nishino et al. | 328/142 |
| 5,208,594 | * | 5/1993 | Yamazaki | 341/143 |
| 5,349,353 | * | 9/1994 | Zrilic | 341/144 |

OTHER PUBLICATIONS

N. Kouravas, "Operations on Delta Modulated Signals and Their Applications in Realization of Digital Filters," The Radio and Electronics Engineering, vol. 48, No. 9, Sep., 1978, pp. 431–438.*

Hein and Zakhor in Sigma Delta modulators: Nonlinear Decoding Algorithms and Stability Analysis, Kluwer Academic Press, 1993, pp 48.*

Zrilic, "A New Digital to Analog Converter based on Delta Modulation", IEEE Proceedings of the 37th Midwest Symposium on Circuit and Systems, Aug., 1994, pp. 1193.*

Freedman and Zrilic, "Nonlinear Arithmetic Operations on the Sigma Delta Pulse Stream" Signal Processing Elsevier, vol. 21, 1990, pp 25–35.*

Zrilic, et al., Realization of Digital Filters for Delta–Modulated Signa 30th Midwest Symposium on Circuits and Systems, Syracuse Univ. 8/87.

Zrilic, "An Algorithm for Synthesis of Linear and Nonlinear Functions—Waveform Synthetizer", Unpublished patent disclosure 9/88.

Zrilic, "Mapping of Boolean functions onto non–logical domain", dated Oct. 26, 1988, publication status unknown.

Zrilic, et al. "Simplifier realisation of delta–sigma decoder" IEE Electronics Letters Online No. 19971057, 6/97.

Winkles et al., "Hardware Implementation of a Delta–Sigma Decoder–Digital Approach", NASA Technical Advances in Aeronautics, Space Sciences and Technology, Earth Systems Sciences, Global Hydrology, and Education vol. II, pp. 422–425 (1997).

(List continued on next page.)

*Primary Examiner*—Peguy JeanPierre
(74) *Attorney, Agent, or Firm*—Richard A. Bachand

(57) ABSTRACT

A delta sigma digital signal processor (Delta DSP) accepts at its input a delta-sigma modulated pulse stream (46) and average it in simplified finite impulse response (FIR) filter (48). The output of averager (49) is fed in a functional processor (50). A functional processor consists of a number of selectable arithmetic units. These units are programmed in PAL or microprocessor. Selector output (52) is added with signal (54) which is delayed output of (61) multiplied by constant (1−L). Output of functional processor circuit (61) is fed into simplified version of FIR filter of length N to get desired analog output signal. The second part of invention is related to a delta-sigma analog signal processor (Delta ASP) which incorporates delta-sigma modulator (148) and analog double switch (141) for processing of input analog signal (130) and delta-sigma pulse density stream (132). Analog low pass filter (142) is used to get desired output (140).

10 Claims, 35 Drawing Sheets

OTHER PUBLICATIONS

John–Kaysing et al., "Hardware Implementation of a Delta–Sigma Decoder–Digitalapproach", NASA Technical Advances in Aeronautics, Space Science and Technology, Earth Systems Sciences, Global Hydrology, and Education vol. II, pp. 426–430 (1997).

Zrilic, "A Special Purpose Ternary Delta Multiplier", 30th Midwest Symposium on Circuits and Systems, Syracuse Univ. 8/87.

Zrilic, et al., "Implementing Signal Processing Functions on Ternary Encoded Delta–Modulated Pulse Streams", 1988 IEEE International Symposium on Circuits and Systems, vol. 2, pp 1553–1956 (1988).

* cited by examiner

CIRCUITS AND METHODS FOR FUNCTIONAL PROCESSING OF DELTA MODULATED PULSE DENSITY STREAM

This application is a C-I-P of Ser. No. 08/594,433 filed Jan. 31, 1996, abandoned.

BACKGROUND OF THE INVENTION

1. Field of the Invention

This invention relates to improvements in waveform processors, and more particularly to improvements in digital signal processing of sigma delta modulated (SUM) pulse streams, and in one aspect to methods and circuits for mixed analog/digital processing of one or more delta modulated (DM) pulse streams.

2. Relevent Background

Traditionally, DM has been used in military applications, particularly in adaptive delta modulation (ADM). Recent advances in semiconductor technology and in charged coupled capacitor devices led many integrated circuit (IC) producers, such as Motorola, Analog Devices Corporation, Crystal, and others, to successfully design chips for a variety of delta modulators. The basic idea is to use a highly oversampled linear delta modulator (LDM) to achieve a high signal-to-noise ratio. A high frequency (in the order of MHz) pulse density stream is not suitable for direct conventional digital signal processing (DSP), and therefore, decimation is generally used to assure proper speed, in order to interface with existing DSP hardware.

In the past, there have been attempts to process the DM pulse stream in a direct fashion. To achieve such direct processing, specialized hardware is needed. One known approach for addition of two DM sequences using a delta adder (DA) was proposed by N. Kouvaras, "Operations on Delta Modulated Signals and their Applications in Realization of Digital Filters," *The Radio and Electronics Engineering*, Vol. 48, No. 9, September, 1978, pp. 431–438, incorporated herein by reference. Therefore, the operation of a delta adder circuit is to add digital input signals $X_n$ and $Y_n$ applied to the input terminals. Assuming $X_n$ and $Y_n$ to be DM sequences, then, as shown in FIG. 1, the output sequence produced by the delta adder is also a binary DM sequence. According to Kouvaras' findings, a demodulated signal of sum $S_n$ results in an analog signal s(t) whose amplitude is equal to ½ (x(t)+y(t)), as shown in FIG. 1a.

Yet another attempt to process DM signals in a direct form was proposed by Massey, U.S. Pat. No. 4,450,532. Massey proposed a circuit arrangement for receiving an applied analog type electrical signal and generating a pulse train output signal whose average frequency is proportional to the square of the applied analog signal.

Lu, U.S. Pat. No. 4,622,649, proposed an improved convolution processor that requires no multiplication operations. Yamazaki, US patent 5,208,594, proposed using a multibit signal processing technique to process one bit DM pulse stream.

Simone, U.S. Pat. 3,314,015, synthesized an "artificial transfer network", having a desired transfer response, employing high speed digital and analog techniques.

Nishino, et al., U.S. Pat. No. 4,730,165, proposed a nonlinear signal processing apparatus employing analog signal processing techniques. The time varying input signal is nonlinearly processed by a differential circuit and then arithmetically combined with the input signal.

Yet another approach, described by Kikkert in U.S. Pat. No. 4,320,361, deals with mixed analog/digital signal of a DM pulse stream. The digital data is arranged to operate a switch which, in the case of amplitude modulation, produces carrier frequency pulses.

SUMMARY OF THE INVENTION

In light of the above, therefore, it is an object of the invention to provide a circuit and apparatus for signal processing using a Sigma Delta Modulator (SDM) pulse stream.

It is another object of the invention to provide an improved method and circuit for performing fully digital signal processing, utilizing novel pulse density modulation techniques and mixed analog/digital signal processing, as well.

These and other objects, features, and advantages of the invention, will become apparent to those skilled in the art from the following detailed description, when read in conjunction with accompanying drawings and appended claims.

As will become apparent, the present invention addresses two novel processing devices for a DM pulse stream. The first one is fully digital, and the second one is mixed analog and digital.

BRIEF DESCRIPTION OF THE DRAWING

The invention is illustrated in the accompanying drawing, in which:

FIG. 7d and 7e show corresponding waveforms.

DETAILED DESCRIPTION OF THE PREFERRED EMBODIMENTS

Figure 1:
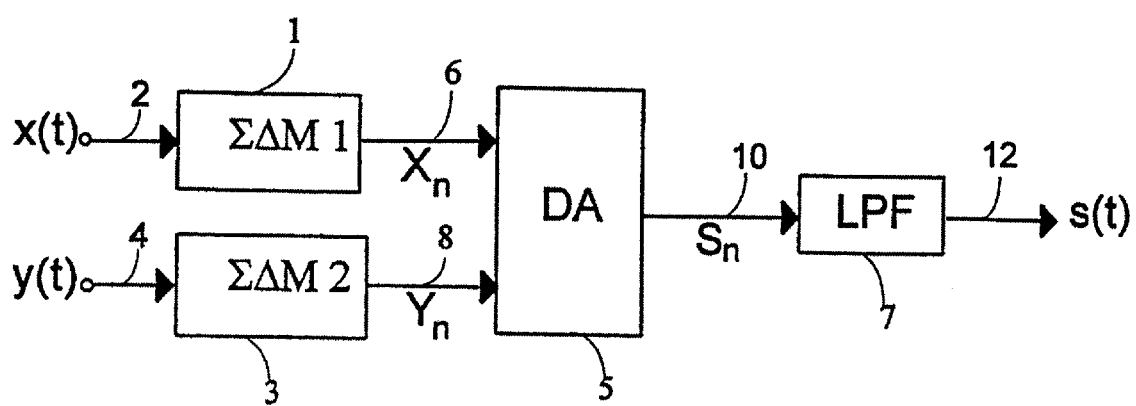
FIG. 1 is a block diagram of a Delta Adder (DA), of the type proposed by Kouvaras, according to the prior art.
Figure 1A:
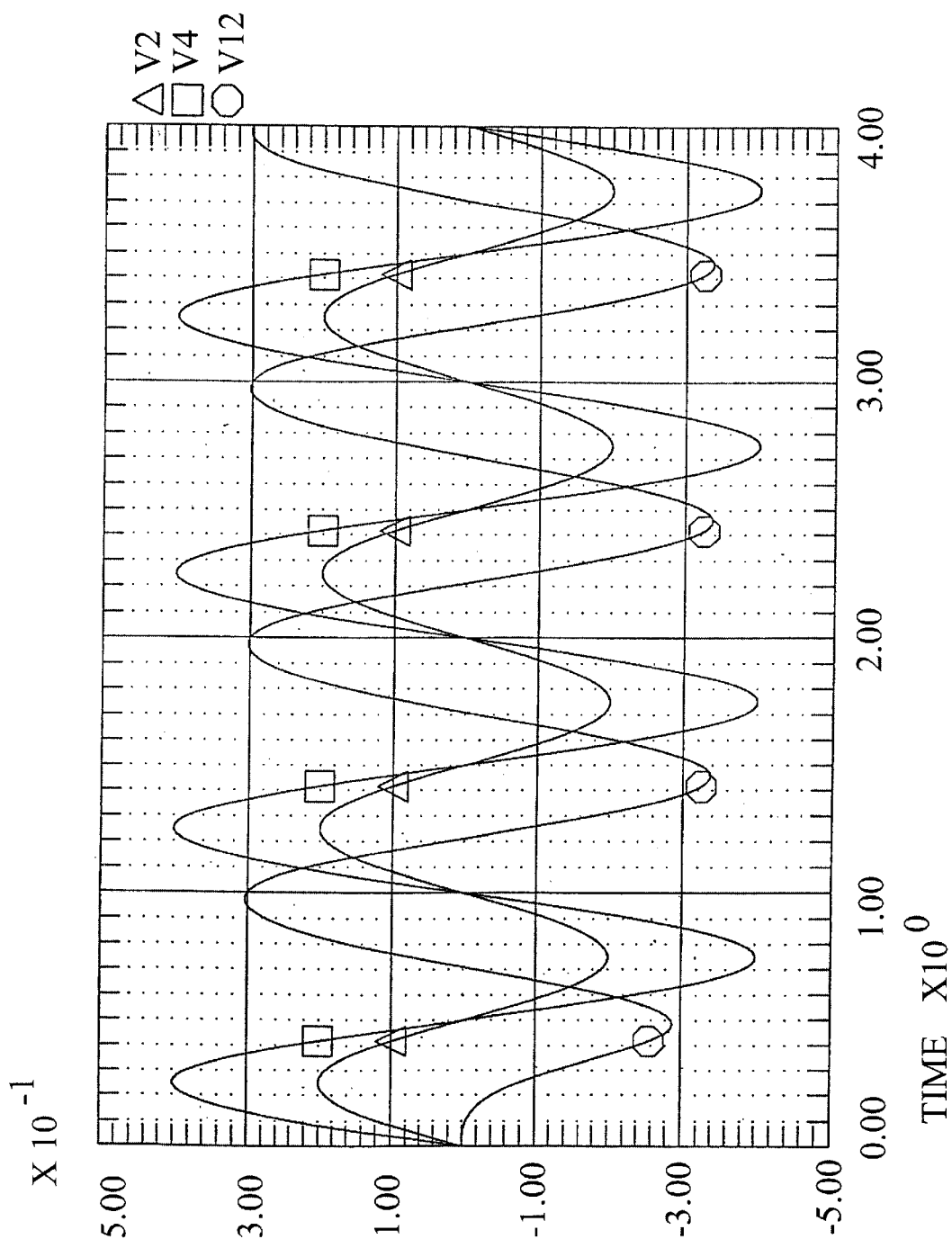
FIG. 1a presents corresponding waveforms.
Figure 2:
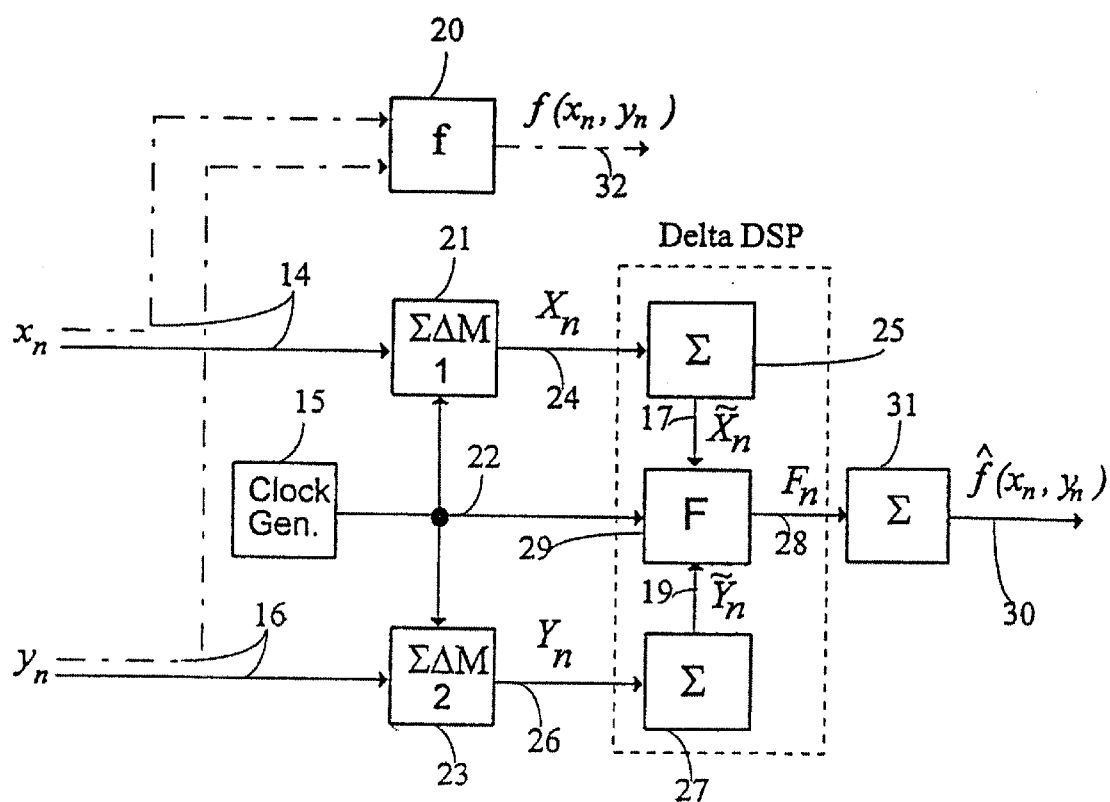
FIG. 2 is a block diagram of a Delta DSP for performing linear and nonlinear operations on synchronous Sigma Delta Modulated pulse streams $X_n$ and $Y_n$, respectively, according to a preferred embodiment of the invention.

A general embodiment of a fully digital Delta Processor is shown in FIG. 2. As shown, an analog input signal $x_n$ is applied on line 14 to "Sigma Delta Modulator 1" (21) which produces a digital signal, $X_n$ (line 24). An analog input signal $y_n$ is applied on line 16 to "Sigma Delta Modulator 2" (23) which produces a digital signal, $Y_n$ (line 26). It is important to point out that both "Sigma Delta Modulator 1", and "Sigma Delta Modulator 2" are synchronous; i.e., they are clocked at the same sampling frequency by clock pulses (line 22) from a clock generator (15), so that digital pulse streams $X_n$ and $Y_n$ are synchronous. To perform arithmetic operations on $X_n$ and $Y_n$ streams, it is imperative that the two Delta Sigma modulators (21 and 23) are identical and synchronous. The Delta DSP circuit is clocked at the same frequency as well.

Figure 3:
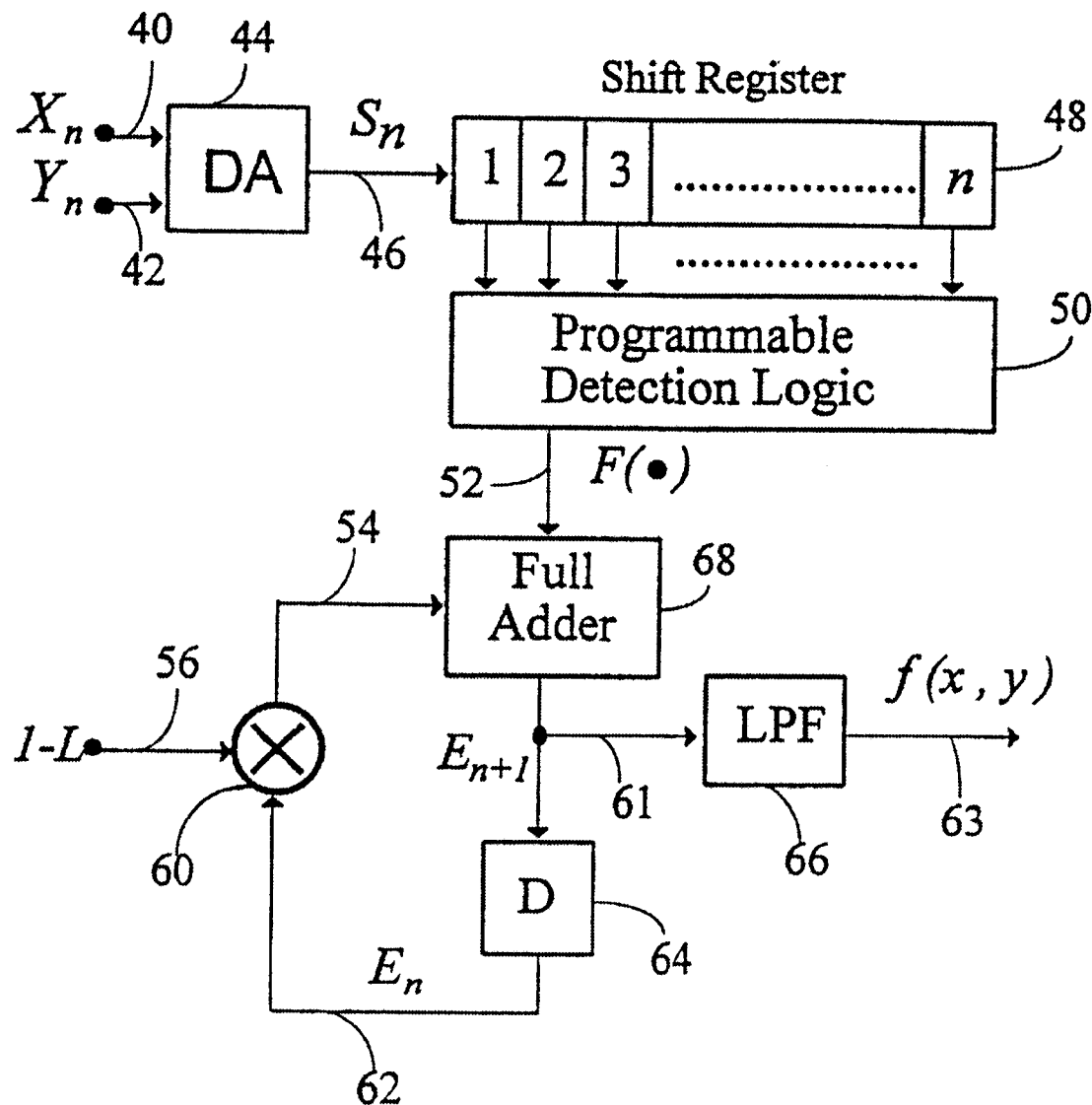
FIG. 3 is a block diagram of a Delta DSP, which provides a basic building block for addition, subtraction, multiplication, compression, amplification, scaling, and the like, according to a preferred embodiment of the invention.

The filtered output $\hat{f}(x_n, y_n)$ (line 30 in FIG. 2) represents a predefined arithmetic operation that is performed on pulse streams $X_n$ and $Y_n$. In all examples that follow, the Delta DSP circuit of the type shown in FIG. 3 is used as a basic processing element. Prior realizations of this circuit, first introduced by Zrilic et al, "Realization of Digital Filters for Delta-Modulated Signals", 30th *Midwest Symposium on CIRCUITS AND SYSTEMS*, Syracuse University, August, 1987, incorporated herein by reference, and later by Freedman and Zrilic, "Nonlinear Arithmetic Operations on the Delta Sigma Pulse Stream", *Signal Processing*, Elsevier, Vol. 21, 1990, pp. 25–35, incorporated herein by reference, have the inherent disadvantage of being able to handle only one input signal. Therefore, multiplication of two signals has not been possible. The circuit of FIG. 3, however, is an improvement on previous circuit realizations.

In order to deal with a bipolar binary signal (+1,−1) my algorithm has a new form:

$E_{n+1} = E_n(1-L) + F(S_n)$, where $S_n = \frac{1}{2} * [X_n + Y_n - (C_n - C_{n-1})]$, $C_n = X_n Y_n C_{n-1}$.

According to a fully digital broad aspect of the invention of FIG. 2, it will be seen that outputs of the circuits, f ($x_n$, $y_n$) and $\hat{f}(x_n, y_n)$ are virtually identical. The function f($x_n$, $y_n$), on line 32, is a theoretical (ideal) realization and function $\hat{f}(x_n, y_n)$, on line 30, is realized using my new method. The symbol "Σ" (25,27) in FIG. 2 stands for an averager. The block with symbol F(29) in FIG. 2 represents a function to be realized.

Thus, the delta digital signal processor (Delta DSP) of FIG. 2 multiplies two digital signals, if multiplication is required, to produce a multiplied digital output signal, and after demodulation, to produce an analog output. In other words, according to this invention, the outputs of the circuits, f and $\hat{f}$, in FIG. 2 are virtually identical.

A preferred embodiment of the invention provides a universal Delta signal processor, shown in FIG. 3. This circuit can perform linear and non-linear arithmetic operations on a digital SDM pulse stream. The modulated SDM output signal is digitally processed by a delta processor to modify the modulated digital output signal according to a predefined function to produce, after demodulation (averaging), an analog representation of the predefined function.

An inherent problem of delta adders, such as those of the type shown by Kouvaras, is that they generally introduce a scaling factor of 0.5 after each addition. This can be a serious problem when a large number of cascaded delta adders are used. It is possible to overcome this problem by using my new approach shown in FIG. 3, simply by setting one of two inputs to be an idle sequence, say $Y_n = I_n$, and multiplying by a corresponding constant L ($I_n$= . . . +1,−1,+1,−1 . . . , which after demodulation, gives zero output).

The meaning of functional blocks in FIG. 3 is as follows:

DA stands for Delta Adder (44), whose output $S_n$ (line 46), may be fed into a shift register (48). The Delta Adder is a full adder with inverted roles of Sum and Carry out as described by Kouvaras or Zrilic.

The shift register (48) includes a chain, for example, of D-flip flops. The length of the shift register is related to the amount of error that is present at output 63, signal f(x, y). The shift register plays the role of an averager from FIG. 2. Error considerations for a given length of the shift register are given by Hein and Zakhor in *Sigma Delta Modulators: Nonlinear Decoding Algorithms and Stability Analysis*, Kluwer Academic Press, 1993, pp. 48.

Programmable detection logic, block 50, is made up of digital circuitry, and can be realized using a field programmable gate array (FPGA). Realization is dependent on the function to be realized. For example, if addition or subtraction of two signals $X_n$ (line 40) and $Y_n$ (line 42) is desired, then the outputs of the shift register are fed into full-adders with signal F(·) (output 52). For a shift register length of 30, multiplication with constant L=15 is needed to avoid attenuation of the DA. If a squaring operation is required, then squared values of x(t) have to be detected from the content of the shift register. For example, if an input signal x(t)=3, then logic to detect 9 has to be designed. Or if x(t)=−4, then logic to detect 16 has to be designed.

Line 61 is the output of full adder (68) fed into a low pass filter (66) and a delay element (64). Signal $E_n$ on line 62 is then multiplied in multiplier (60) by the constant (1−L) (line 56). Output of binary multiplier (line 54) is the second input of the full adder (68).

Figure 3A:
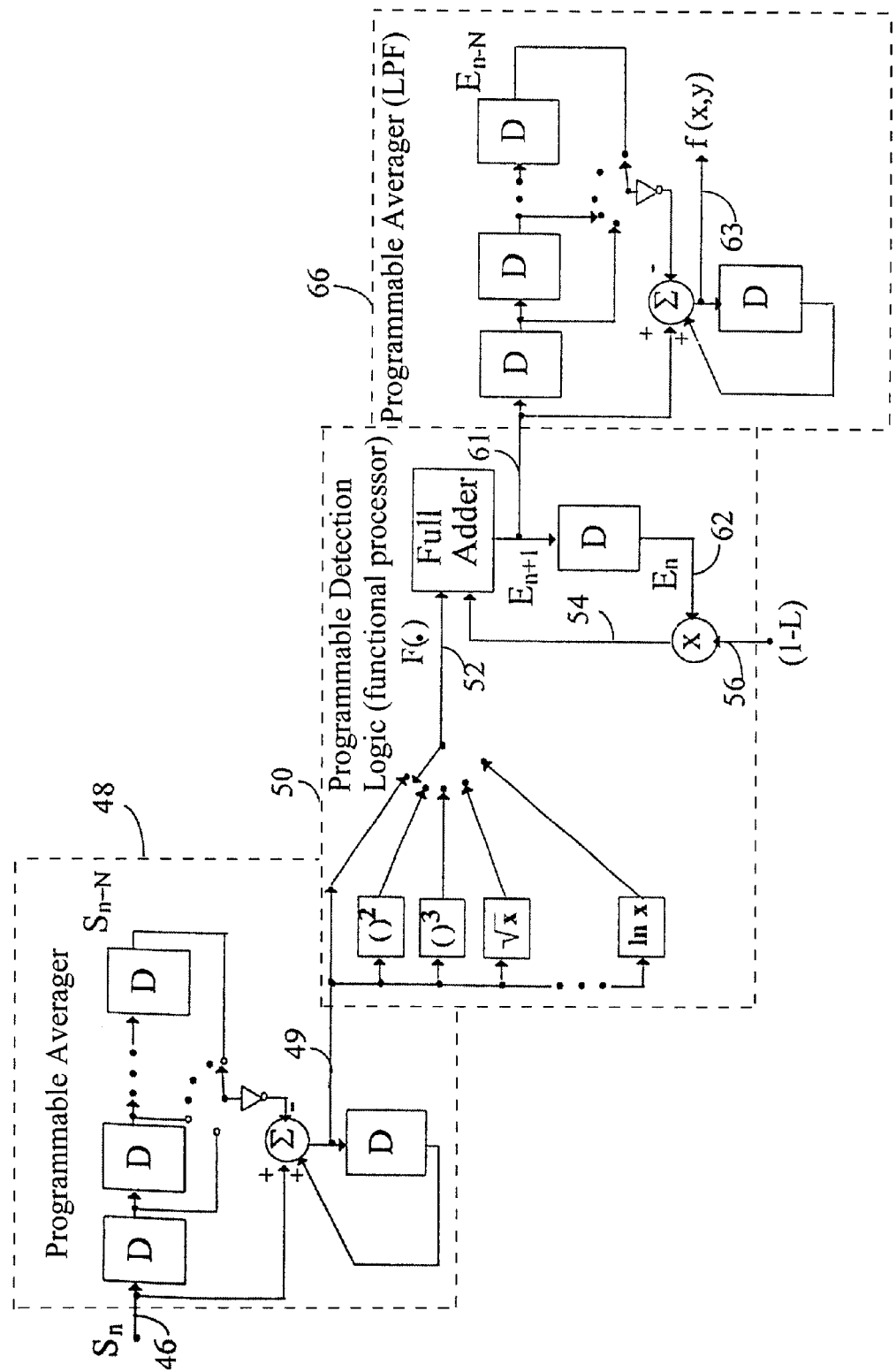

In reference [5] Zrilic et al disclosed a circuit for multiplication of delta modulated pulse stream by a constant. They have shown that the circuit can be successfully used in synthesis of digital filters based on delta modulation (binary, ternary, etc.). They did not disclose how to do nonlinear waveform processing, and they did not disclose how the circuit is built. Later, in September 1988 Zrilic notarized a block diagram of his invention [6]. However he did not show details of invention. The same year, on October 26, Zrilic has shown that using his invention, binary DM signal can be mapped onto a non-logical domain [7]. Again, Zrilic did not show details of realization. In his original patent application, 08/594,433, Zrilic disclosed delta DSP, FIG. 3. However role of shift register, block (48), and Programmable Detection Logic, block (50), is not disclosed in details. In his recent publication Zrilic et al [8] disclosed simplified structure of delta-sigma decoder employed in his original invention. FIG. 3a shows a detailed logic diagram of Delta DSP processor from FIG. 3. It is well known that signal $S_n$ (46) is high density, high redundant and highly oversampled.

This means that one bit (+1 or −1) can mean something or nothing. To get a real estimate of the analog input into the delta-sigma encoder, the average of $S_n$ is needed. It is apparent that the longer the averager the better the estimate. Freedman et al [4], pp.31, FIG. 2, indicated use of a 1-bit delay line instead of an averager. A delay line is not an averager, nor a low pass filter. This filter can be costly. For example, in audio applications a 4096 tap FIR filter is required [13]. To overcome this problem, Zrilic et al [8] found that only two tap of FIR have to be added, first and last. This finding has significantly simplified ordinary FIR averager. The N-bit adder is no longer needed. Zrilic et al [8] proposed two solutions, analog and digital. The digital solution is implemented by Winkles et al [9] and it serves as DM-to-PCM converter. Realization and simulation results of Zrilic and his students [9,10] have shown the correctness of this approach. In his work [7], Zrilic has proven that input to recursive part, FIG. 3a, DSM signal has to be averaged. On one example, $z=x/4-x^3$, he has shown that any nonlinear function can be realized. When multiplication by a constant less than one has to be achieved, the length of the averager has to be multiplied by a reciprocal value. In the example of reference [7], multiplication by 0.25 (i.e. ¼) has to be performed. To the decide value of programmable constant L, we multiply average with 4, i.e.

$$L = (\text{length of averager})*4 = 30*4 = 120,$$

or in the same example of nonlinear operation of cubing, the value of programmable constant L is:

$$L = (\text{length of averager})^3 = (30)^3 = 27,000.$$

When squaring operation has to be performed, the value of constant L is, $L=(\text{length of averager})^2$, or if the multiplication by a constant greater than one has to be performed, the value of constant is $L=(\text{length of averager})/\text{constant}$. For example, if the length of the averager is 30 and we would like to amplify the signal by a factor of 2, then the value of L is 15. It is easy to conclude that exponential, or trigonometric functions can be developed in series, and realized easily following the example in reference [7].

FIG. 3a of this disclosure shows that the average value of block (48) is fed into detection logic block, (50). This is a functional processor that can be easily realized with a microprocessor, or it can be customized to perform desired operations. These functions can be found in every pocket calculator. For example, squaring block can be easily realized using an ordinary n bit multiplier or it can be programmed in PDL. It is clear that using the circuit from FIG. 3a, an infinite number of different functions can be realized. Recursive signal $E_{n+1}$ (61) presents the sum of signals (52) and (54). In his original work, Freedman, and Zrilic [4] in FIG. 2, indicated a low pass filter (LPF), but they did not propose a solution. This filter can be any LPF, depending on the resolution required; however, the output of this filter (63) is a digital pulse density stream. Use of the filter proposed in references [8,9,10] significantly simplifies and reduces the cost of the entire system.

It is worth mentioning that FIG. 3a can be used for the processing of a multi-valued delta-sigma signal (46) as first proposed by Zrilic et al in reference [5]. In that case, special proposed hardware has to be designed. In that case, the sign of signal (62) has to be taken and multiplied by constant (1−L).

In the case of microprocessor realization of a block (50), a DM to PCM converter is needed. This converter is introduced in reference [8] and realized in reference [9]. In the case of direct processing of a DM signal (49), dedicated functional circuits are needed. Some of these circuits are introduced in reference [11] and [12].

Figure 4:
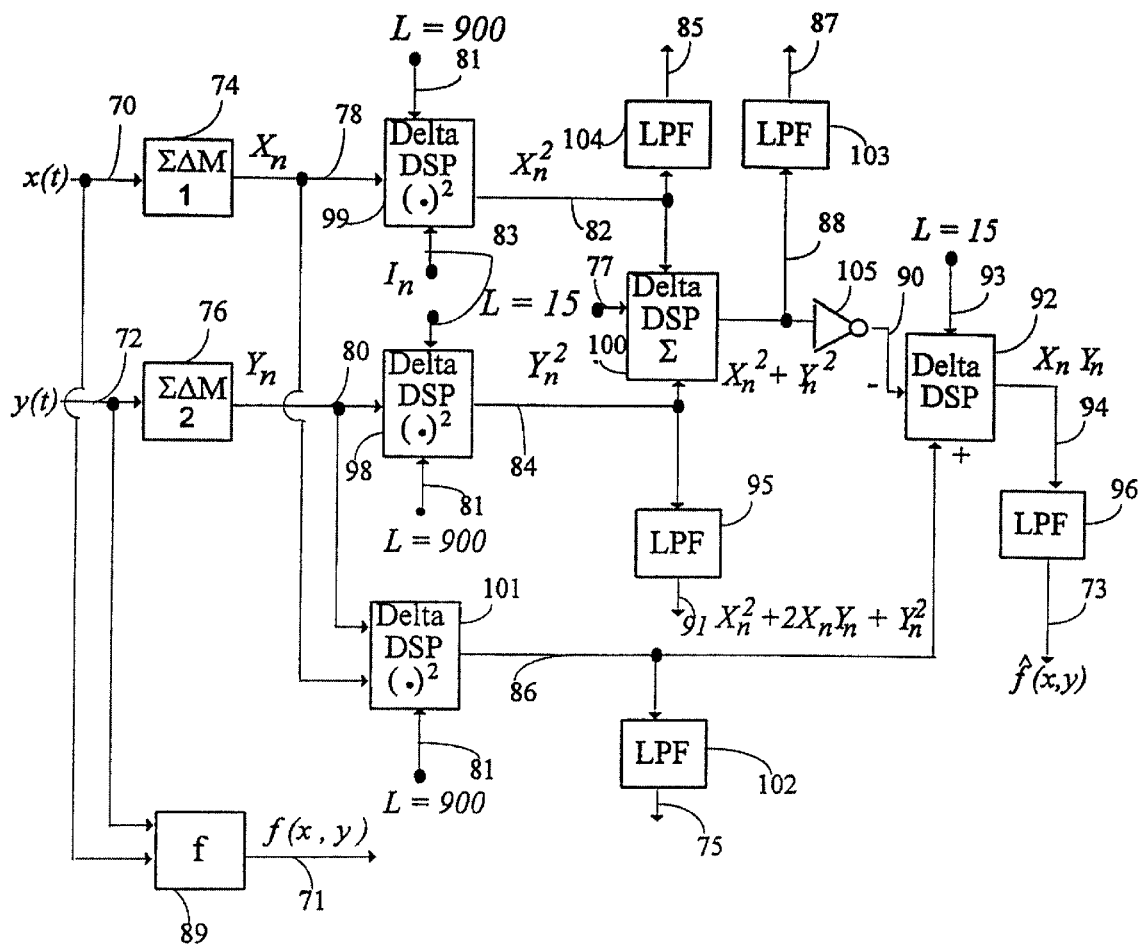
FIG. 4 is a circuit for performing multiplication of two Sigma Delta Modulated signals $X_n$ and $Y_n$, which can performs linear and nonlinear operations on the sequences $X_n$ and $Y_n$.

According to the embodiment of the invention shown in FIG. 2, and using the Delta signal processor of the invention shown in FIG. 3, an example of a circuit to realize a predetermined function is shown in FIG. 4. The predetermined function to be realized is x(t)·y(t). In the circuit embodiment of FIG. 4, two signals 70 and 72 are multiplied. The objective is to show that the theoretical output 71 is virtually identical to the output 73 obtained using my proposed method. It can be seen from FIG. 4 that the circuit is modular, and only Delta DSP is used. For a particular arithmetic operation (linear or nonlinear), the adjustment of constant L and detecting logic is needed.

The meaning of the symbols in FIG. 4 follows. Signal x(t) (line 70) and signal y(t) (line 72) are fed into identical and synchronous sigma-delta-modulators (blocks 74 and 76). Block 89 is the theoretical operator, and its output is signal f(x,y) (line 71). This is the theoretical signal and has the role of reference signal in order to compare it with the result achieved with my circuit, signal $\hat{f}$ $(x_n,y_n)$ (line 73). To realize function x(t)·y(t) we have to realize the function $X_n^2 + 2X_nY_n + Y_n^2$ on line 86. This function is realized by feeding signals $X_n$ and $Y_n$ (lines 78 and 80) into the delta DSP (block 101). Signals $X_n$ and $Y_n$ (again, lines 78 and 80) are fed at the same time to the inputs of two more Delta DSP blocks (98 and 99). The second inputs of these blocks (line 83) is the idle signal sequence $I_n$. Because the squaring operation is required, the value of the time constant L is 900 (line 81). Addition operation is performed (block 100) to realize the sum of $X_n^2 + Y_n^2$. Output of delta DSP (line 88) is fed into inverter (105). To realize x(t)·y(t), subtraction is performed in delta DSP circuit (92). Inputs to block 92 are lines 90 and 86. Signal $X_nY_n$ (line 94) is a pulse density stream. To see what this pulse stream represents, demodulation (LPF) is used (96) It is worth mentioning that all outputs of LPFs (73,75,85,87,91) in FIG. 4 are needed for verification purposes.

Figure 4A:
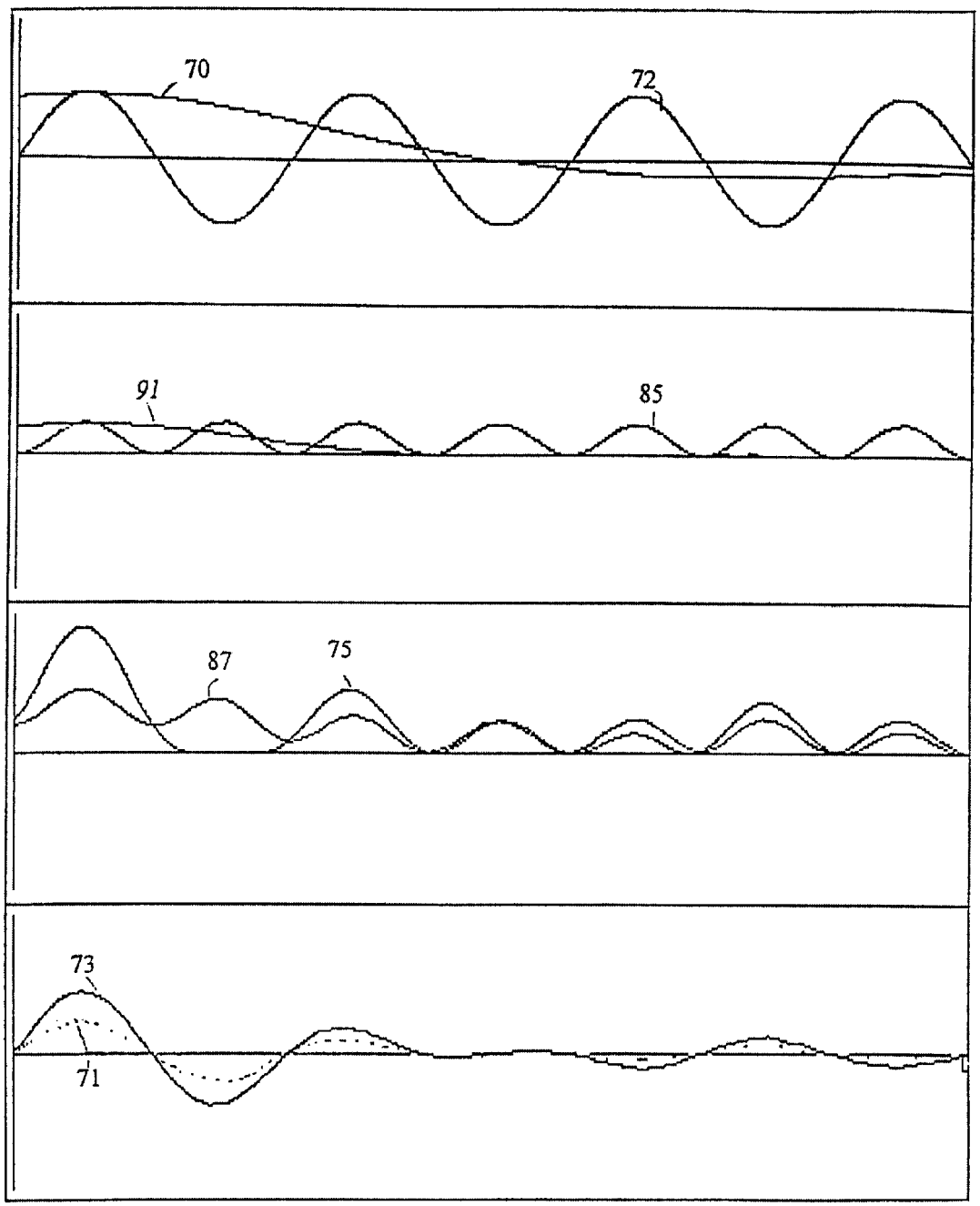
FIGS. 4a to 4d present simulation results for the circuit of FIG. 4.
Figure 4B:
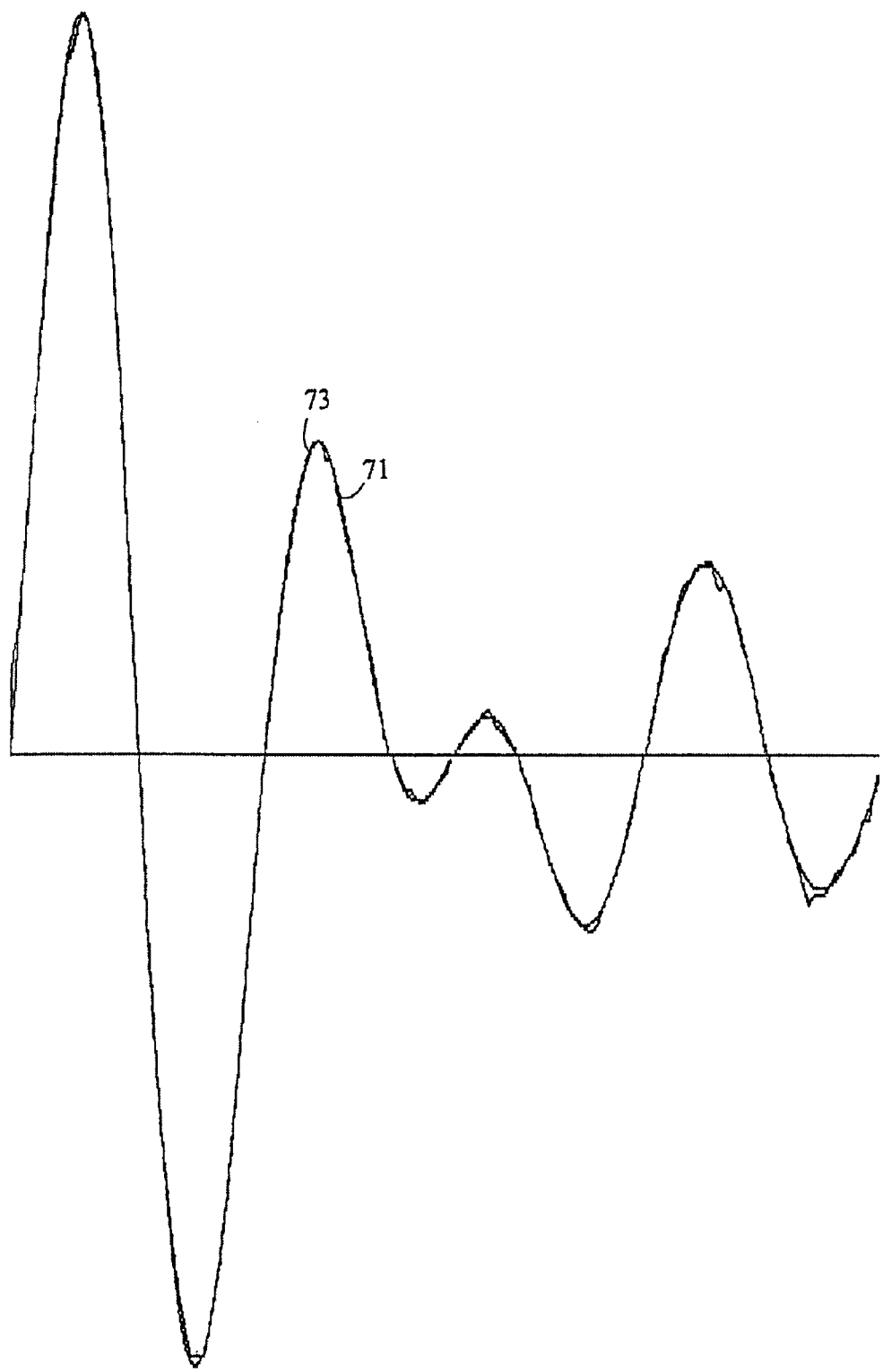

To illustrate performance of the circuit from FIG. 4, two examples are given. FIG. 4a presents the case when analog inputs are sinusoidal signals and exponentially decaying sinusoidal signals. Signals 71 and 73 are the theoretical output and processed output using my method, respectively. FIG. 4b presents an enlargement of ideal and processed outputs. Signal 71 is ideal (no distortion) and signal 73 is realized by the circuit of FIG. 4 which yields small distortion.

Figure 4C:
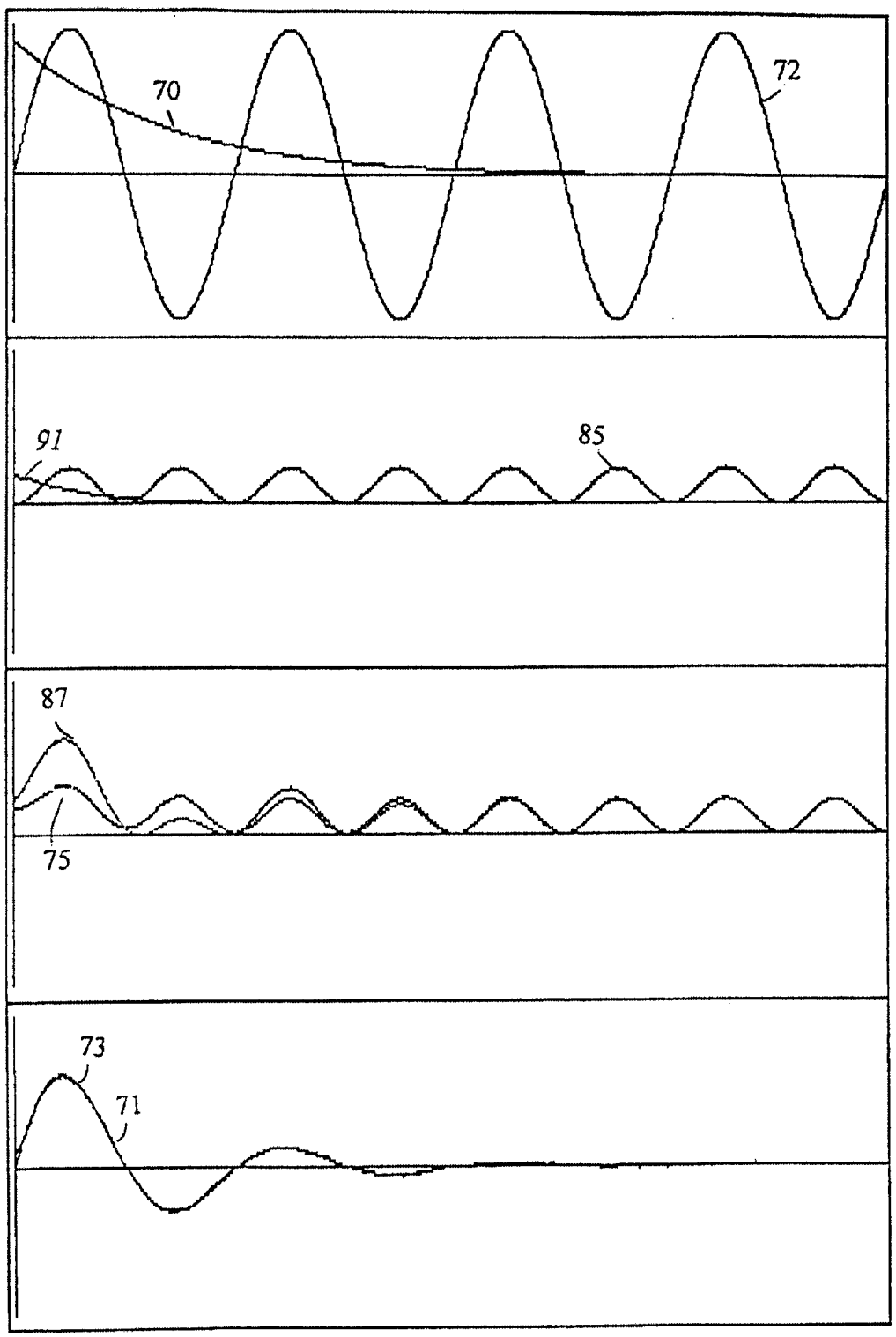
Figure 4D:
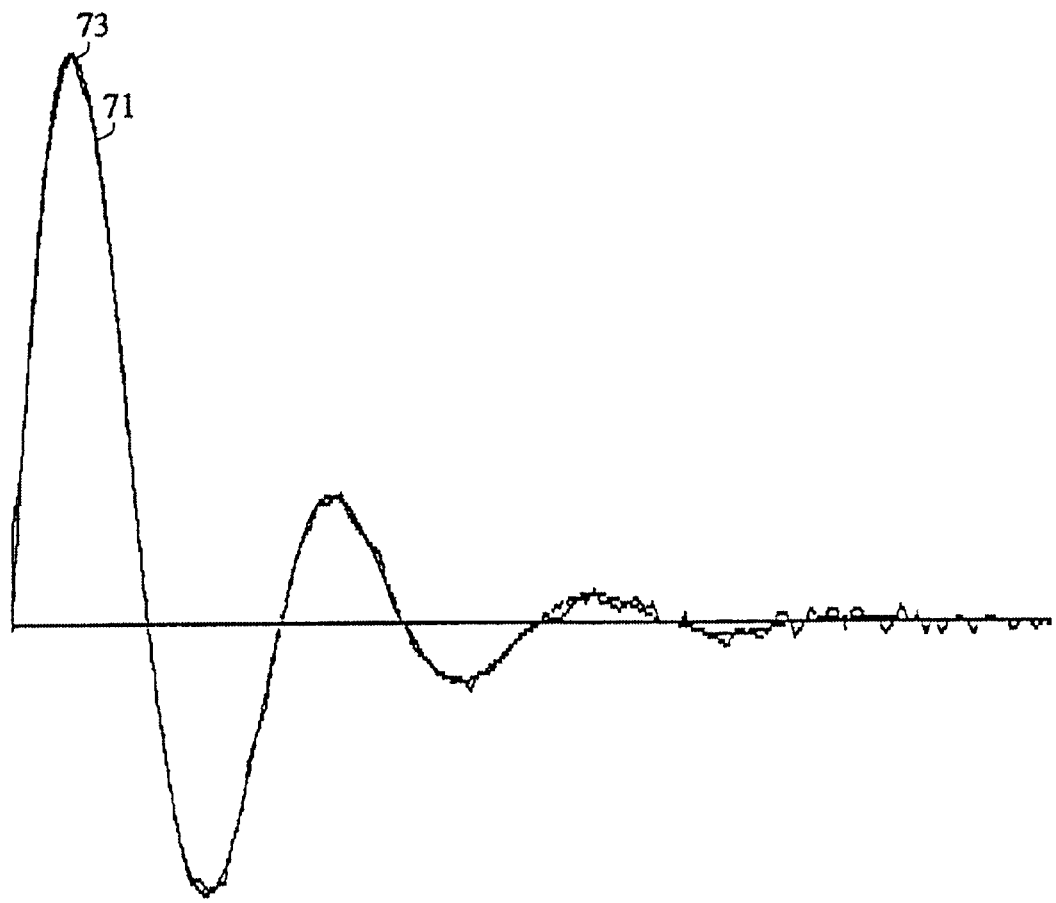

FIG. 4c presents a second example of multiplication of two signals (70 and 72), and FIG. 4d presents enlarged versions of the outputs 71 and 73. It is worth mentioning that in order to see corresponding outputs, low pass filtering is needed. Again the principle of duality holds; for example, from digital sequence $X_n^2$ it is possible to reconstruct analog signal $x^2(t)$, as can be seen, for example, by signal 91 or signal 85 (double frequency). Signals 87 and 85 present reconstructed analog values in points 88 and 86 respectively. FIG. 4d is an enlargement of signals 71 and 73.

It is possible to see a modular structure of the realization in FIG. 4. The same Delta DSP is used again and again. Only the value of constant L and detecting logic is changing. In the example of FIG. 4, the length of shift register is L =30. For multiplication by 2, the value of the constant is, L =(length of shift register)/2=30/2=15(93), and for squaring L is $L=(1^2)=900(81)$. Using a ROM, it is easy to realize constant L.

Figure 5:
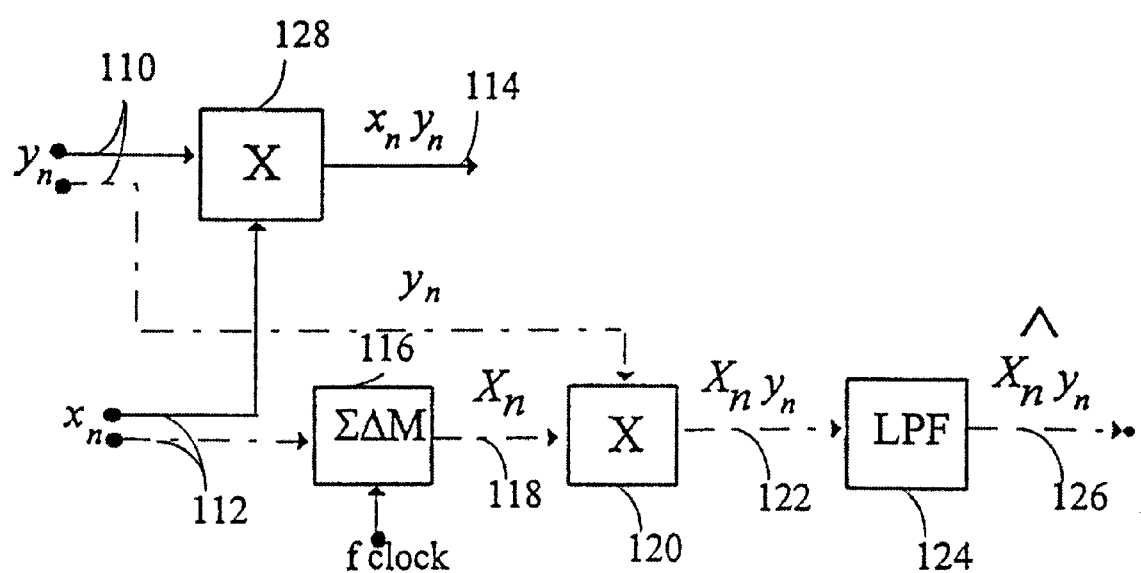
FIG. 5 is a general block diagram of a mixed analog/digital processor, employing the principle of duality of Sigma Delta Modulator pulse stream, according to a preferred embodiment of the invention.

As mentioned, one of the objectives of my invention is to provide mixed analog digital signal processing. FIG. 5 represents a general embodiment of such mixed signal processing circuit. Input signal $y_n$ (line 110) is fed into block 120 and block 128. Second input signal $x_n$ (line 112) is fed into SDM (block 116) and block 128 as well. Signal $X_n$, on line 118 represents the output of SDM. Multiplier, block 120, presents a novel mixed analog digital processor (shown in FIG. 6). Block 128 represents an ideal multiplier. The product $x_n \cdot y_n$ on line 114 is the theoretical value of the multiplication performed, and $X_n \cdot y_n$ on line 122 is the value achieved by the mixed analog/digital processing. According to the mixed analog/digital broad aspect of the invention, it can be seen that outputs of the circuits 128 and 124, $x_n y_n$ and $X_n Y_n$, are virtually identical (lines 114 and 126).

Figure 6:
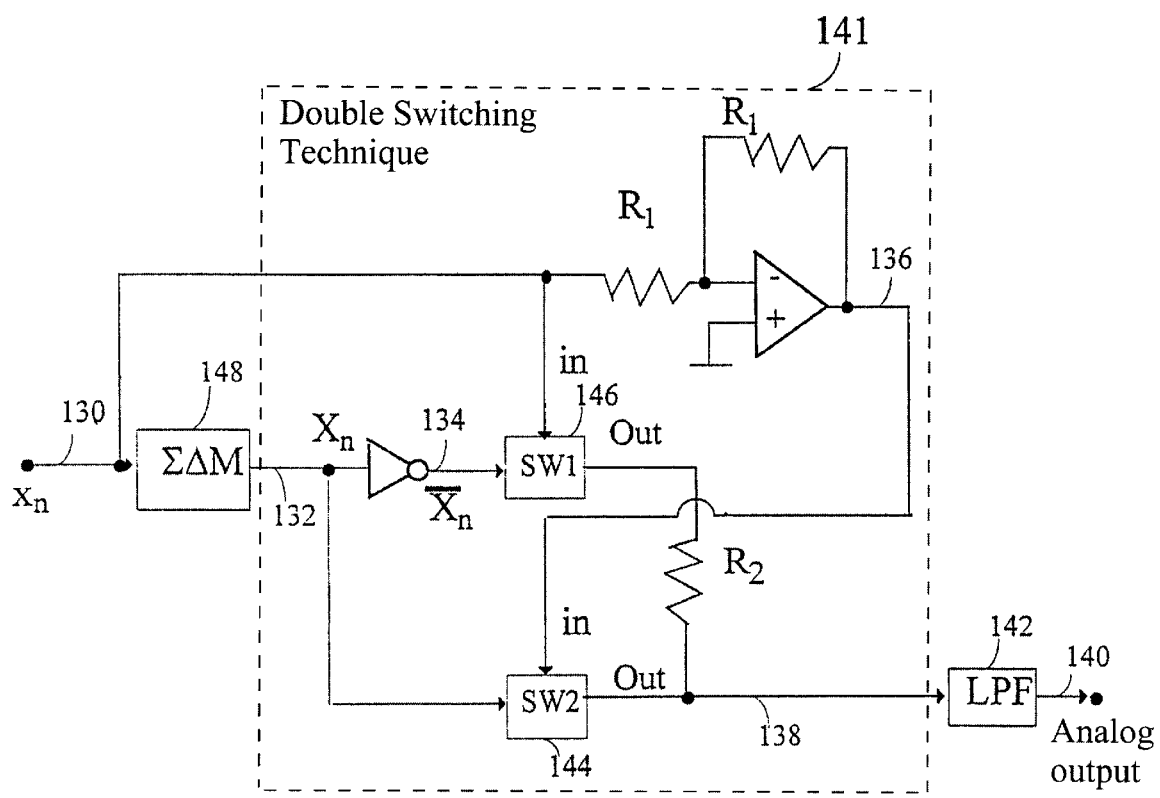
FIG. 6 is a double switch circuit for use in mixed analog/digital processing, according to a preferred embodiment of the invention.
Figure 6A:
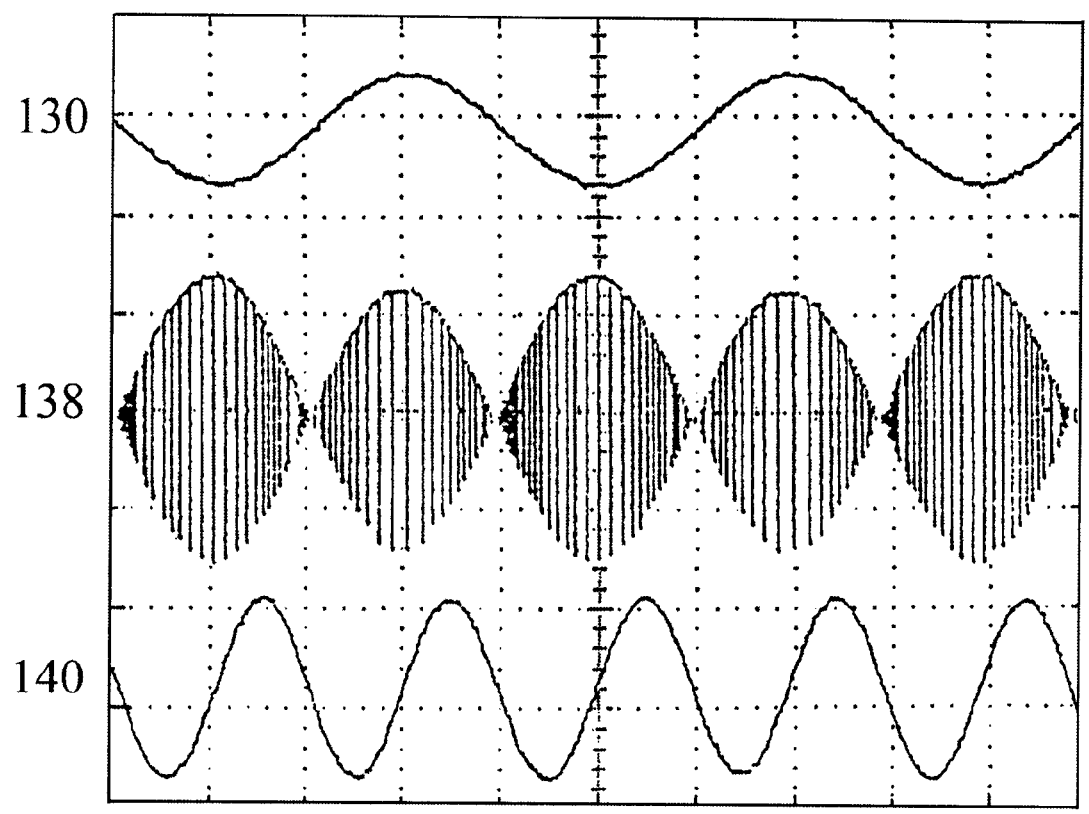
FIG. 6a shows preliminary realization results for the circuit of FIG. 6.

To achieve these results, a double switching circuit for mixed analog/digital signal processing is presented, as shown in FIG. 6. The meaning of the symbols in FIG. 6 follows. Signal $x_n$ (line 130) is an analog signal to be A/D converted in SDM (148). Signal $X_n$ (line 132) is a binary pulse density stream. Signal 134 is the inverted version of $X_n$. Signal 134 is the control signal C for the Switch SW1 (146). The second input to block 146 is the analog signal $x_n$ (line 130). Second switch, SW2, (144) has a control input (line 132) and inverted analog signal (line 136). Signal on line 138 is an AM signal. FIG. 6a shows the results of a bread-board realization. The double switching technique (DSW) of FIG. 6 can be used for the mixed analog/digital processing. In particular, the DSW uses a bilateral switch (an RCA CD 4016 was used in my experimental verification). In FIG. 6, signal $X_n$, and its inversion are fed into control inputs of the switches SW2 and SW1 respectively. At the same time an analog input $x_n$, 130, and its inversion, 136 are fed to the second inputs of the switches. LPF (142) stands for low pass filter. It is worth mentioning that signal $X_n$ line 132, FIG. 6, is wideband digital of fluctuating frequency. To add stable carrier signal $X_n$, (132) can be XOR-ed with the clock signal of sigma-delta modulator (148).

FIG. 6a presents the relevant waveforms produced by the circuit of FIG. 6. It can be seen that the circuit of FIG. 6 provides a doubling of input frequency (compare signals 130 and 140).

Figure 7:
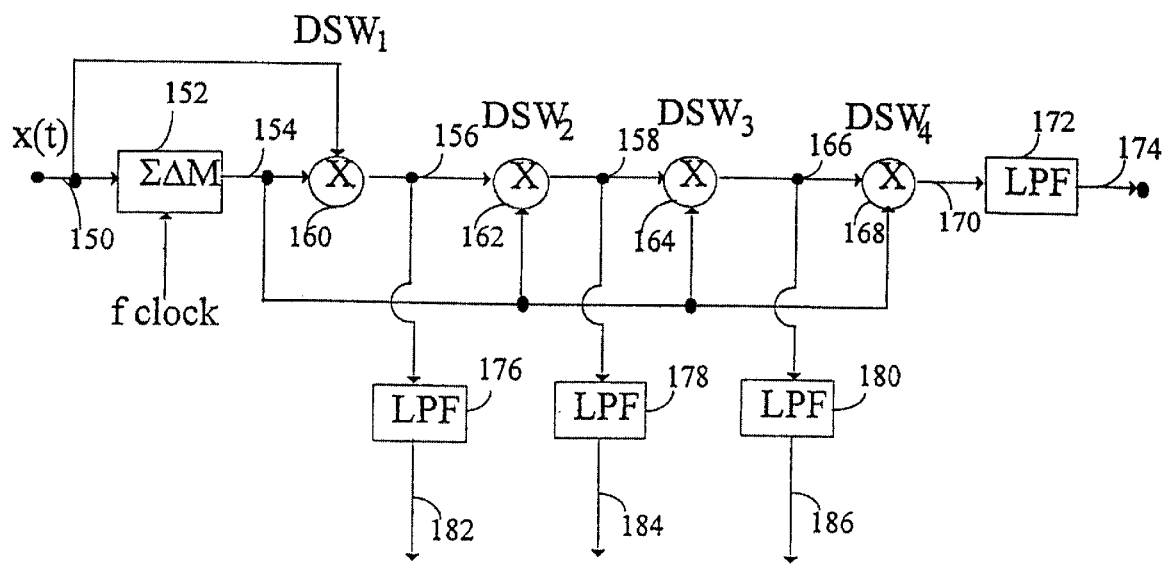
FIG. 7 is a circuit for performing frequency synthesis and amplitude amplification, further demonstrating duality principles, according to a preferred embodiment of the invention.
Figure 7A:
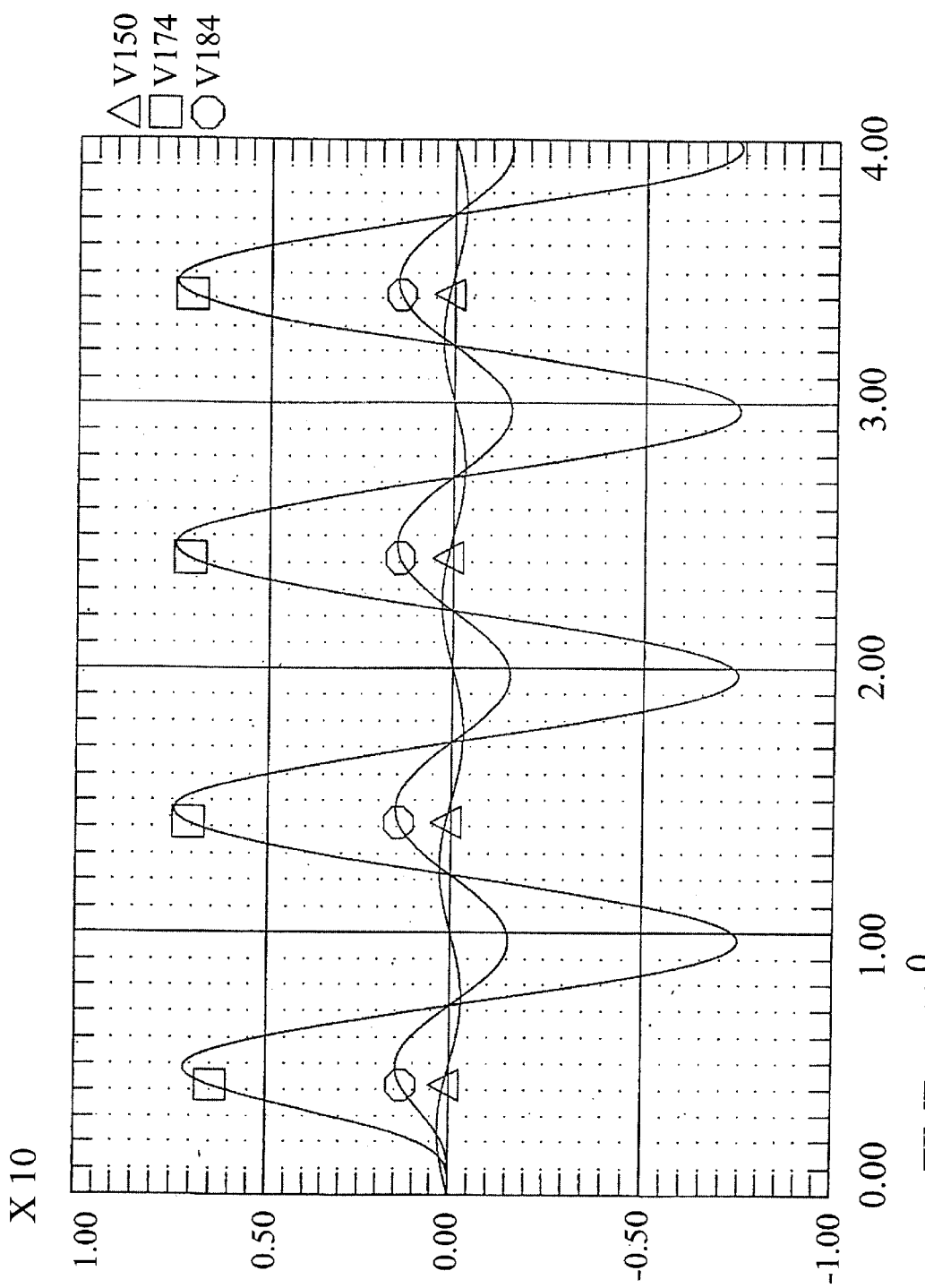
FIGS. 7a and 7b show waveforms at corresponding points in the circuit of FIG. 7.
Figure 7B:
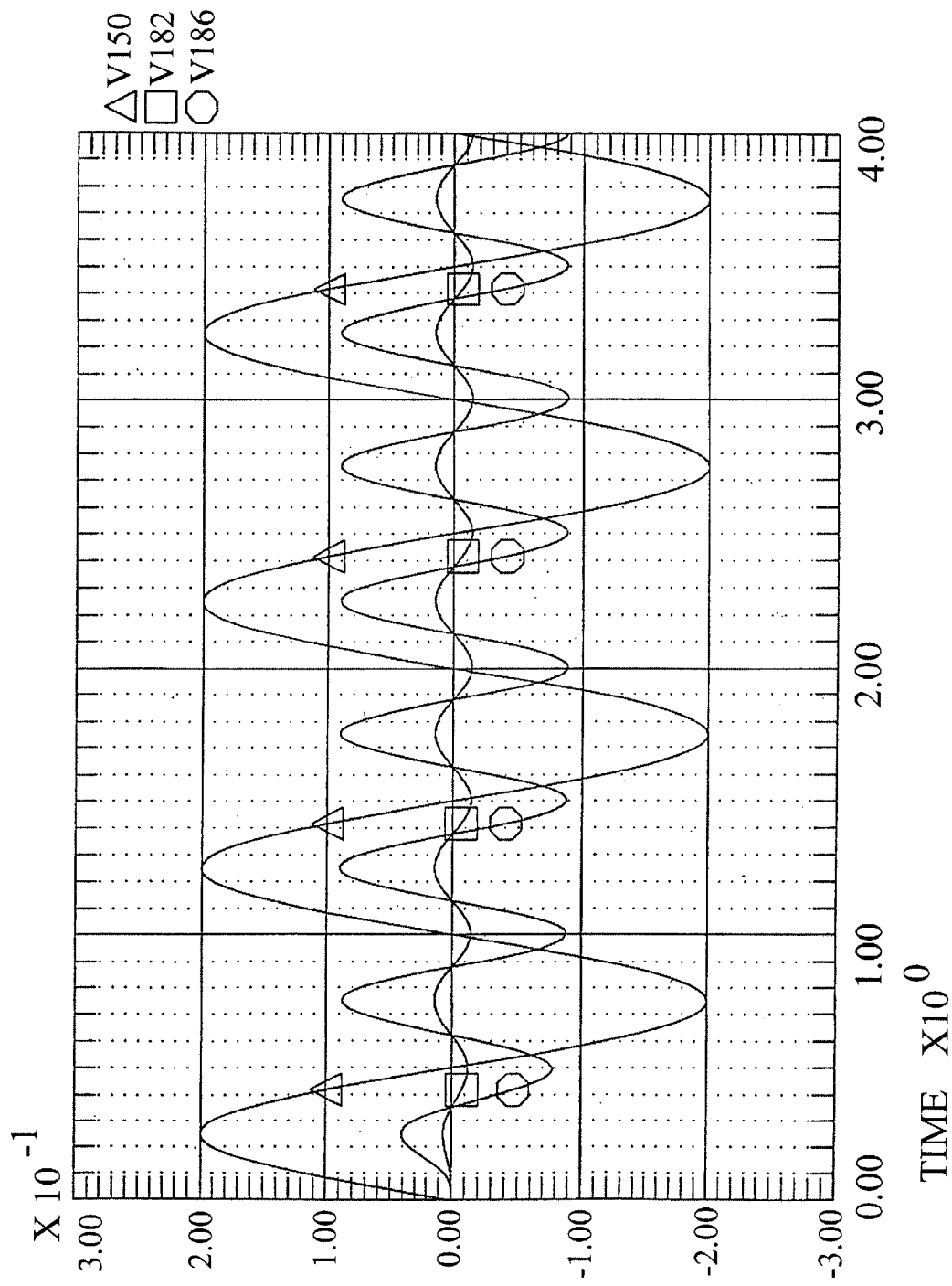

According to my dual theorem, which states that a Sigma Delta Modulated pulse stream $X_n$ is the dual of the analog input $x(t)$; i.e., if the length of the pulse stream is long enough, it is always possible to reconstruct the analog input from pulse stream, with a certain error. Thus, it is possible to realize a system for frequency synthesis, as shown in FIG. 7, which shows the cascade connection of double switches, that is of special interest for frequency doubling and signal amplification. Analog signal $x(t)$, line 150, is fed into SDM of block 152, and $DSW_1$ of block 160. Multiplying signals 154 and 150 results in AM signal 156. After LPF, block 176, analog signal of double input frequency results. Digital data signal on line 154 represents the synchronous carrier for all multipliers (160, 162, 164, and 168). Corresponding waveforms of my simulation results are shown in FIGS. 7a and 7b. It can be seen that amplification of the input signal 150 is performed after even stages (signals 184 and 174). FIG. 7b shows the case of a frequency doubling (signal 182), and amplitude amplification (signal 186).

Figure 7C:
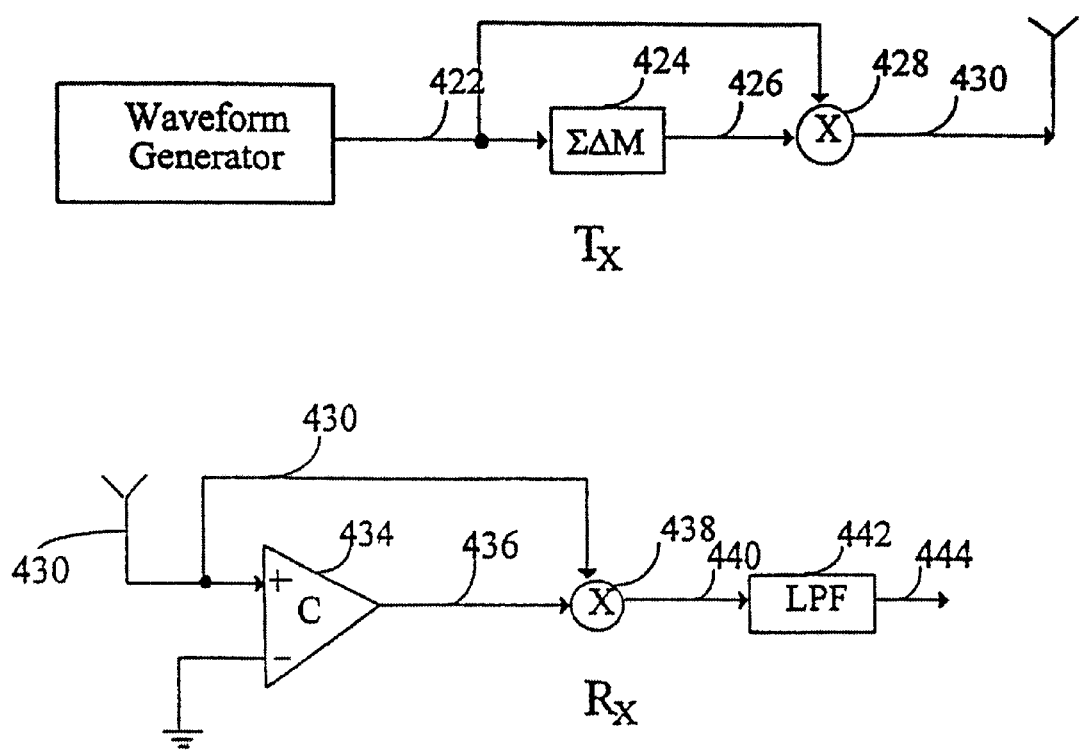
FIG. 7c presents an asynchronous transmission system.

Yet another embodiment of a mixed signal processor is shown in FIG. 7c in which a signal 430 is fed into a new type of asynchronous (non-coherent) AM receiver. To detect a signal 430, there is no need to have synchronous DSWs as in FIG. 7 (the signal 154 is a synchronous carrier). It is possible to transmit a signal 430 to a remote location. The carrier signal (436) at the receiving side (plotted in FIG. 7d) is generated using comparator C (block 434 of FIG. 7c).

Figure 7D:
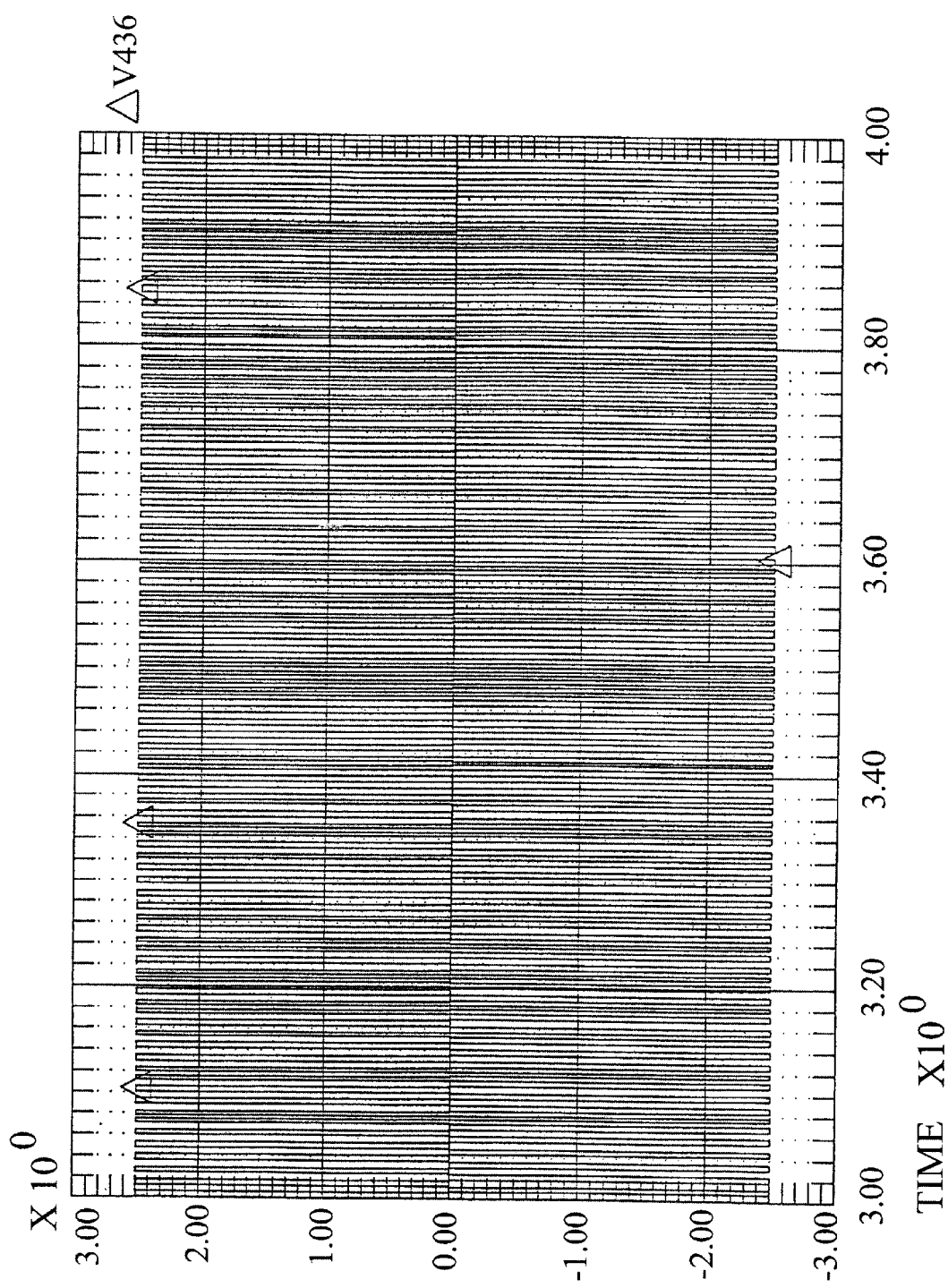

After multiplication and low pass filtering, the signal 444 results. It is worth mentioning that signal 444 is double the frequency of the input signal 422 of the waveform synthesizer because the modulated AM signal is of the type: $S_{AM}(t) = \cos \omega_m t \cdot \cos \omega_c t$ where $\omega_m$ is the frequency of the signal on line 422, and $\omega_c$ is the frequency of the data carrier (line 426). This simple and inexpensive AM receiver can be used in many applications in access control, security systems, personal emergency location, households, etc. The relevant waveforms of the AM receiver are shown in FIG. 7d and 7e. It is also worth mentioning that signal 426 in FIG. 7c can be easily scrambled at the transmission side and then de-scrambled at the receiving side after the comparator, retrieving the original signal at line 436.

In the case of fully-amplitude-modulated signal, $S_{AM}(t) = \cos \omega_c t + \cos \omega_m t \cdot \cos \omega_c t$, addition of a carrier signal is needed. In this case the receiver becomes even simpler; only a comparator and a low pass filter are needed. An example relating the influence of the length of the sample size of an SDM sequence, $X_n$, on signal-to-noise ratio is given by Hein and Zakhor in *Sigma Delta Modulators: Nonlinear Decoding Algorithms and Stability Analysis*, Kluwer Academic Press, 1993, pp. 48, FIG. 3.3, incorporated herein by reference. The signal-to-noise ratio is a function of sample size, and is better for a larger sample size as compared to smaller ones. The influence of length of the averager on the error is shown by Zrilic, as well, in "A New Digital To Analog Converter Based on Delta Modulation", *IEEE Proceedings of the 37th Midwest Symposium on CIRCUITS AND SYSTEMS*, August, 1994, pp. 1193, incorporated herein by reference.

Figure 8:
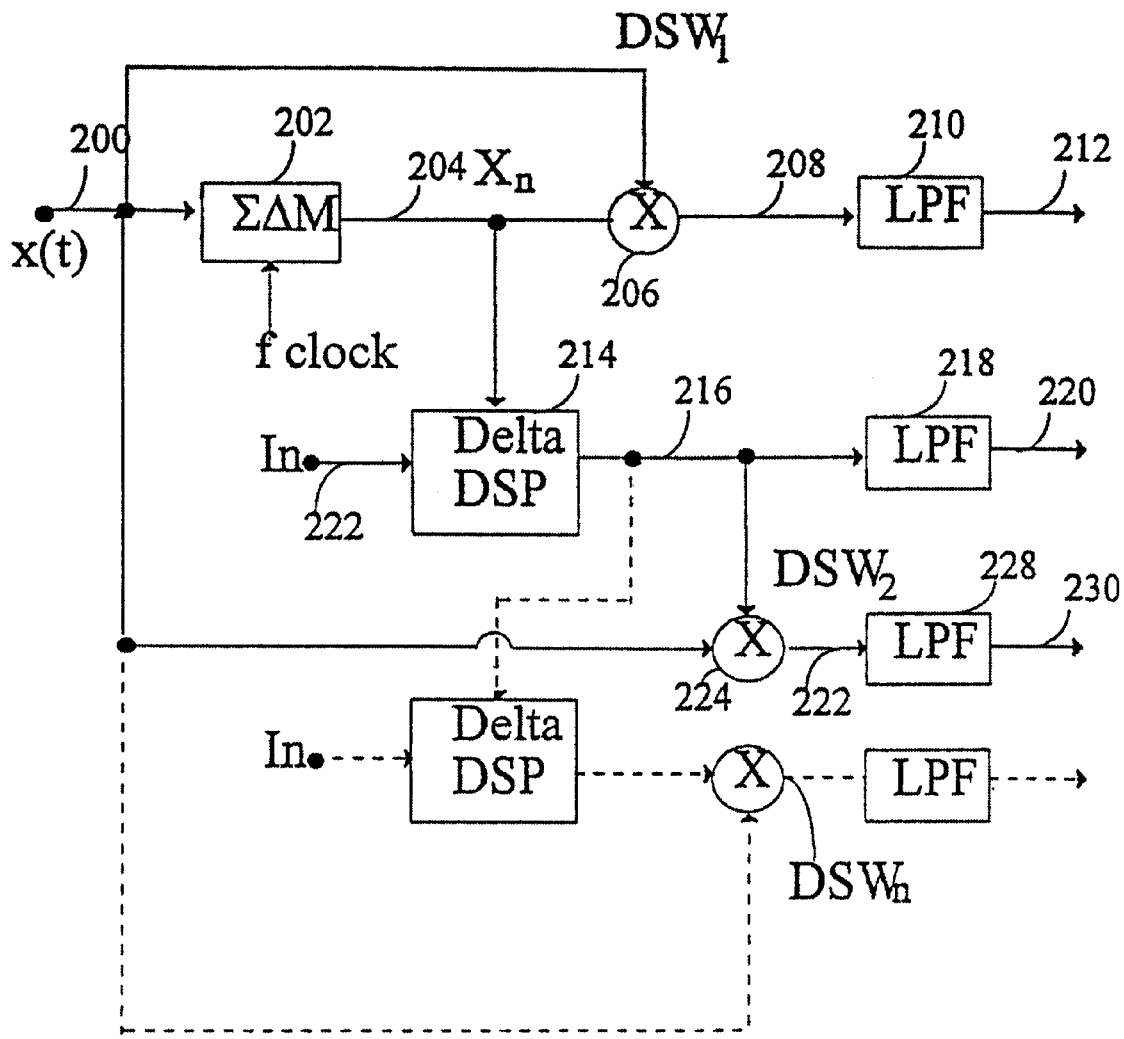
FIG. 8 shows yet another example of combined use of the Delta Signal processor and double switch technique.

Using the embodiments of my inventions in FIG. 3 and FIG. 6, yet another approach is possible for frequency synthesis and signal amplification. FIG. 8 presents a combined use of the Delta Signal Processor and the double switched technique to provide yet another general embodiment of a mixed signal processor. A digital pulse stream is further processed in Delta DSP unit according to FIG. 8. Signal 212 has double the frequency of the input signal 200. The Delta Pulse Stream 204 is fed into Delta DSP to achieve attenuation by a factor of 0.5, and 220 is the attenuated signal. Furthermore, attenuated digital stream, signal 216 is fed into DSW2 to achieve a frequency doubling. The output signal 230 is now both attenuated and has doubled frequency.

Figure 8A:
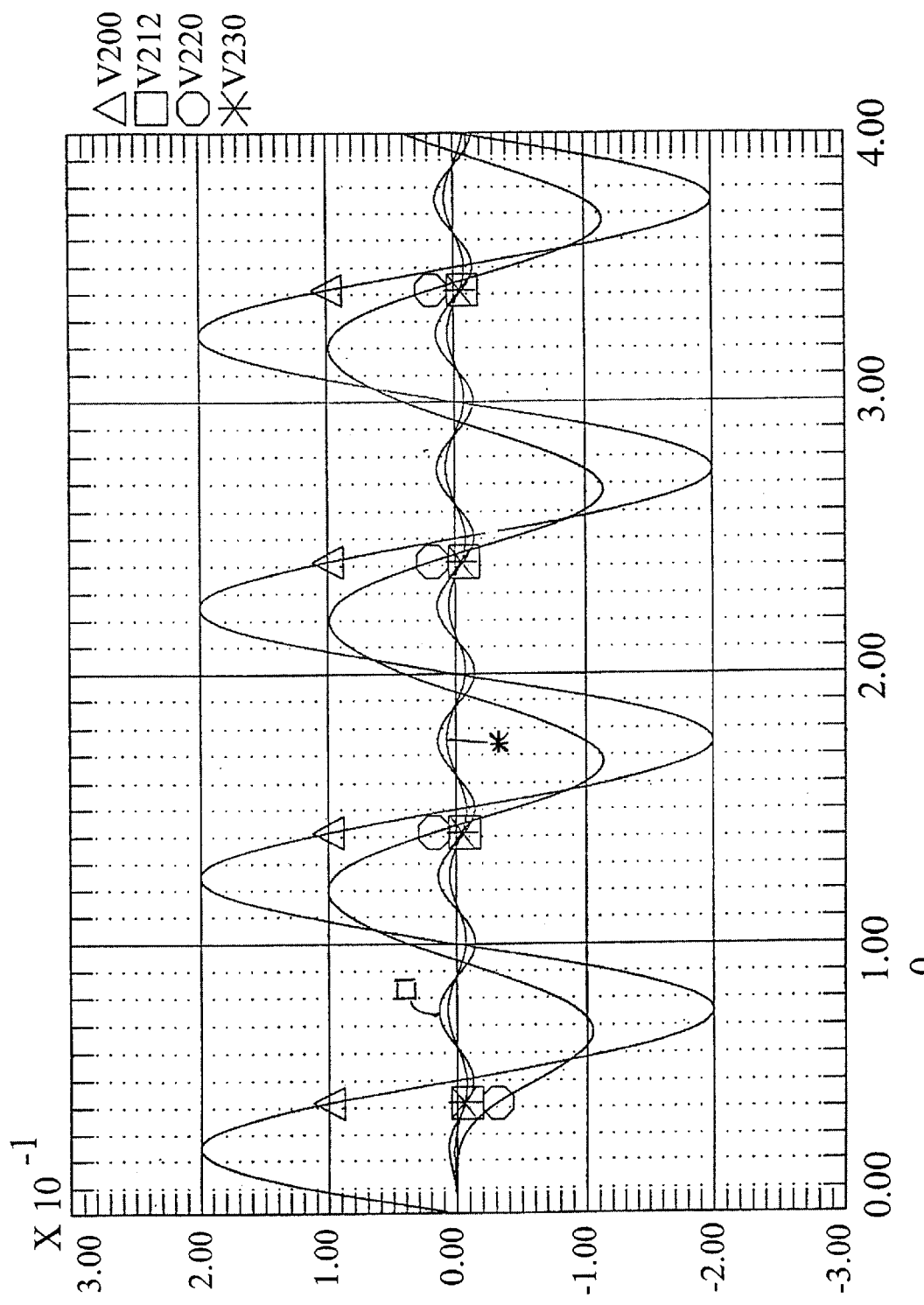
FIGS. 8a and 8b show corresponding waveforms of the example of FIG. 8.
Figure 8B:
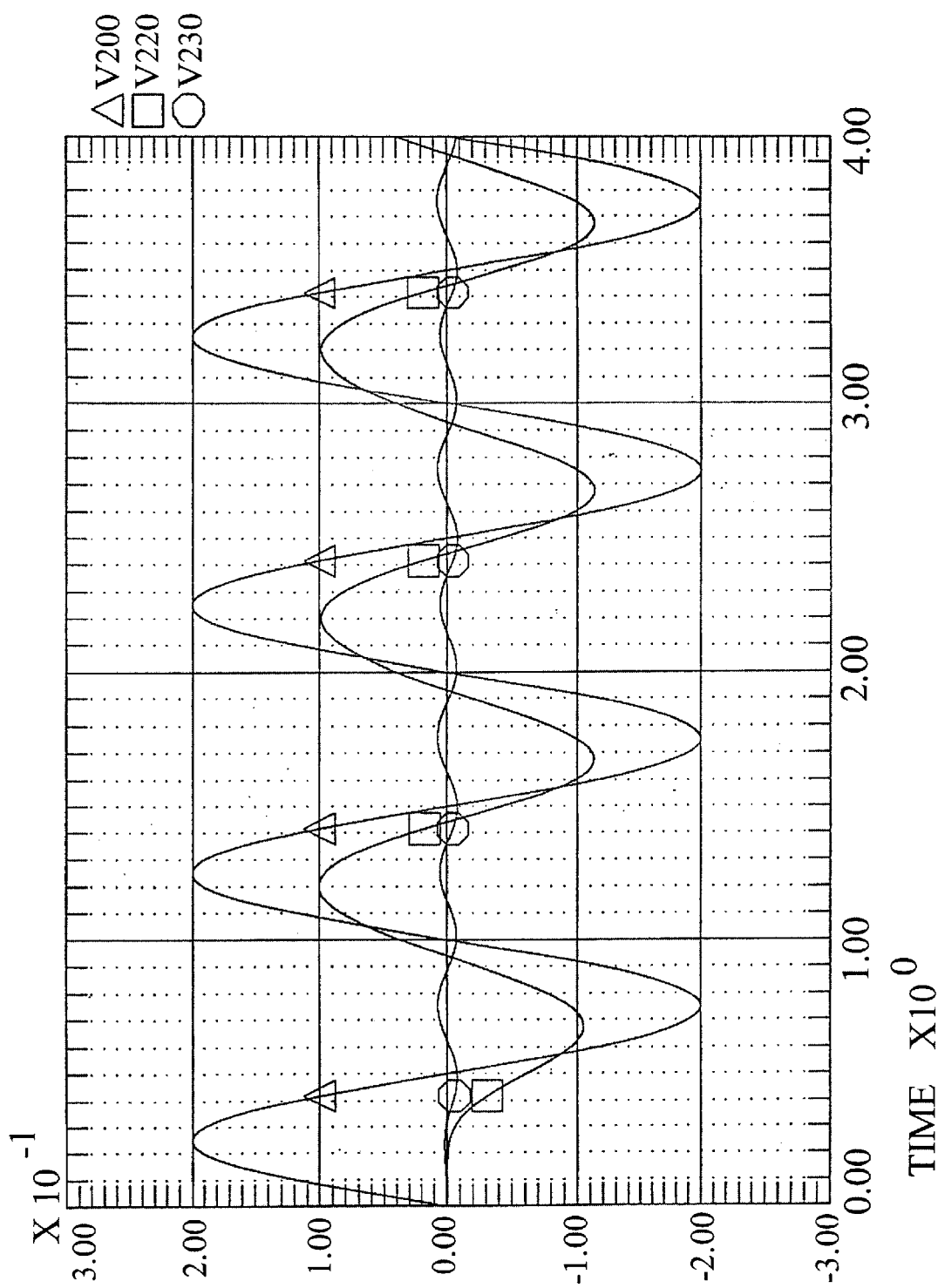

FIG. 8a and FIG. 8b present corresponding signal waveforms for the input signals shown in FIG. 8.

In addition, FIGS. 9 to 14 present a number of additional examples showing how Delta DSP and double switch technique can be used for functional processing of SDM stream.

Figure 9:
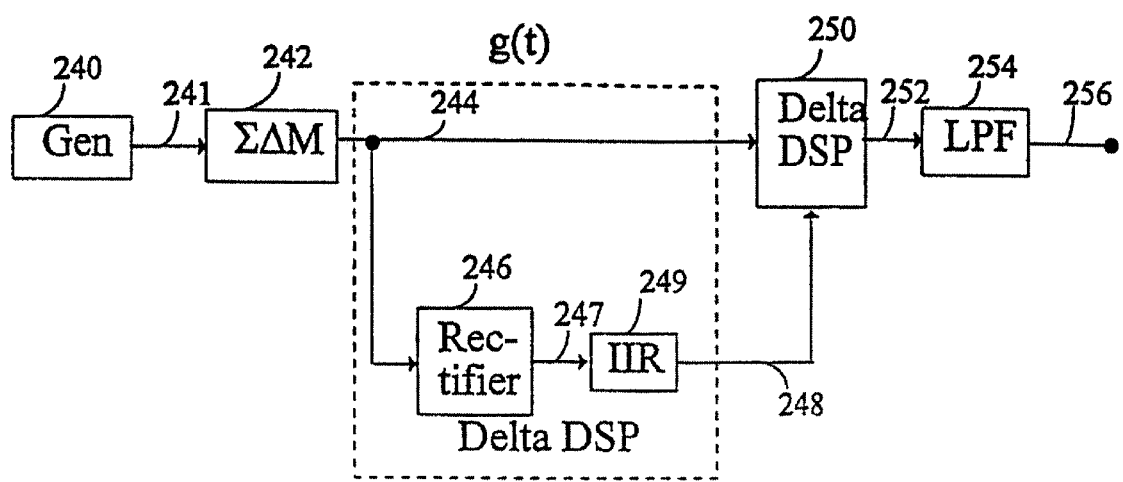
FIGS. 9 to 14 show additional examples of circuits, according to the invention. Corresponding figure numbers followed by an "a" show respective simulation results for the various circuits of FIGS. 9 to 14. The numbers of waveforms correspond to the numbers in the circuits.
Figure 9A:
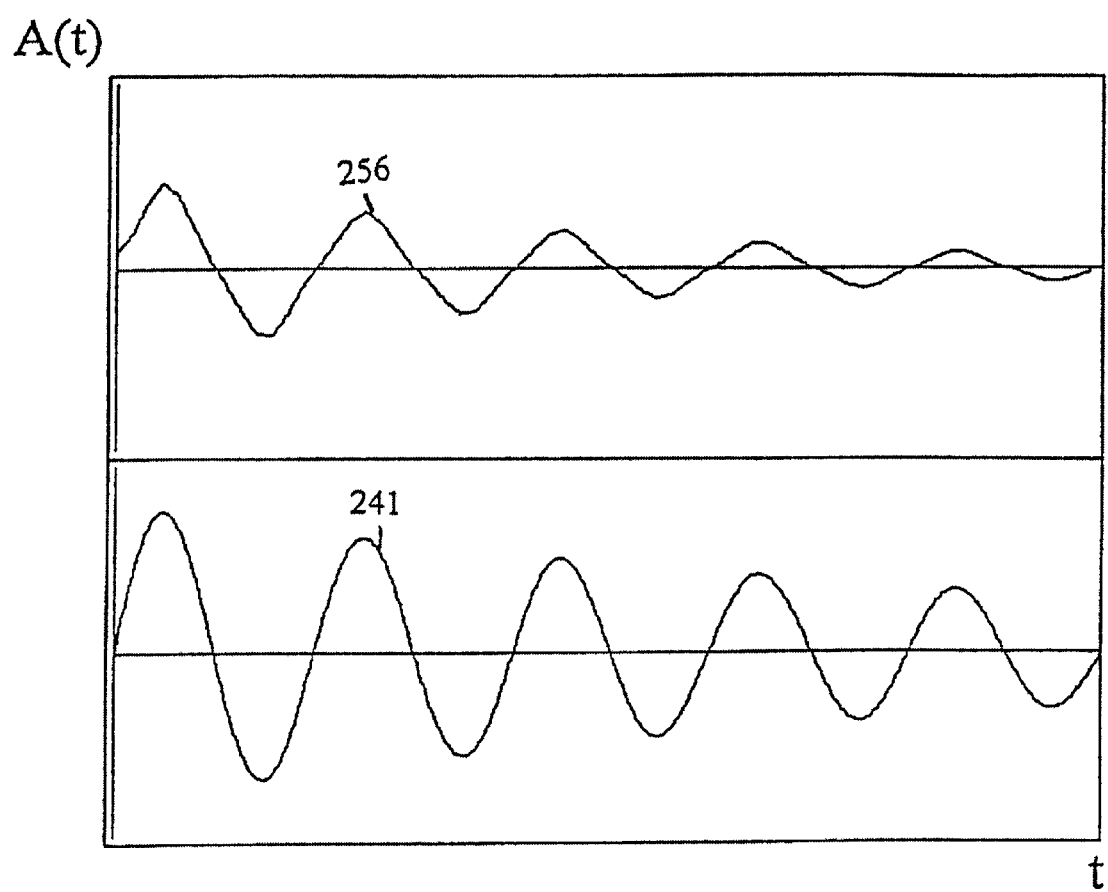

The meaning of numbers in FIG. 9 follow. Exponentially decaying sinusoidal signal (line 241) is fed from a signal generator (240) into SDM (242). Output of SDM (line 244) is fed into rectifier (246), and output of rectifier (line 247) is fed into infinite impulse response filter (249). Signals 244 and 248 are fed into multiplier (250) which outputs (line 252) into low pass filter (254) and circuit output signal (line 256) results. Signals on lines 241 and 256 are plotted in FIG. 9a.

Figure 10:
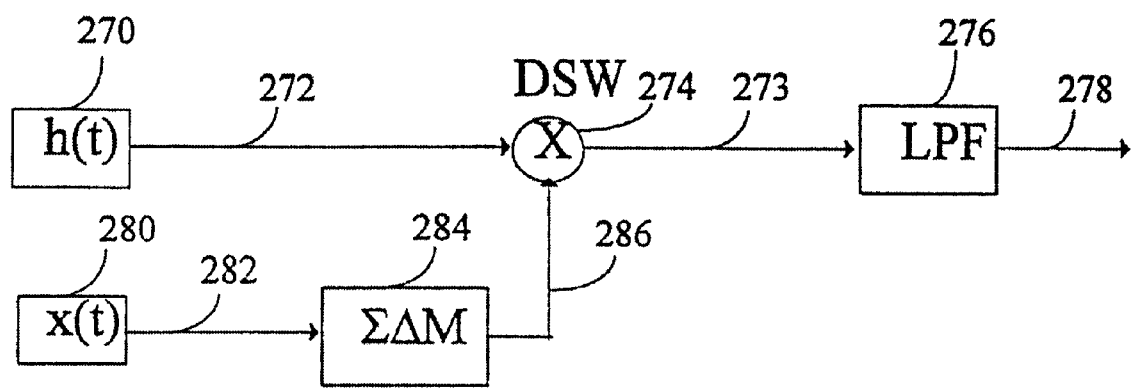
Figure 10A:
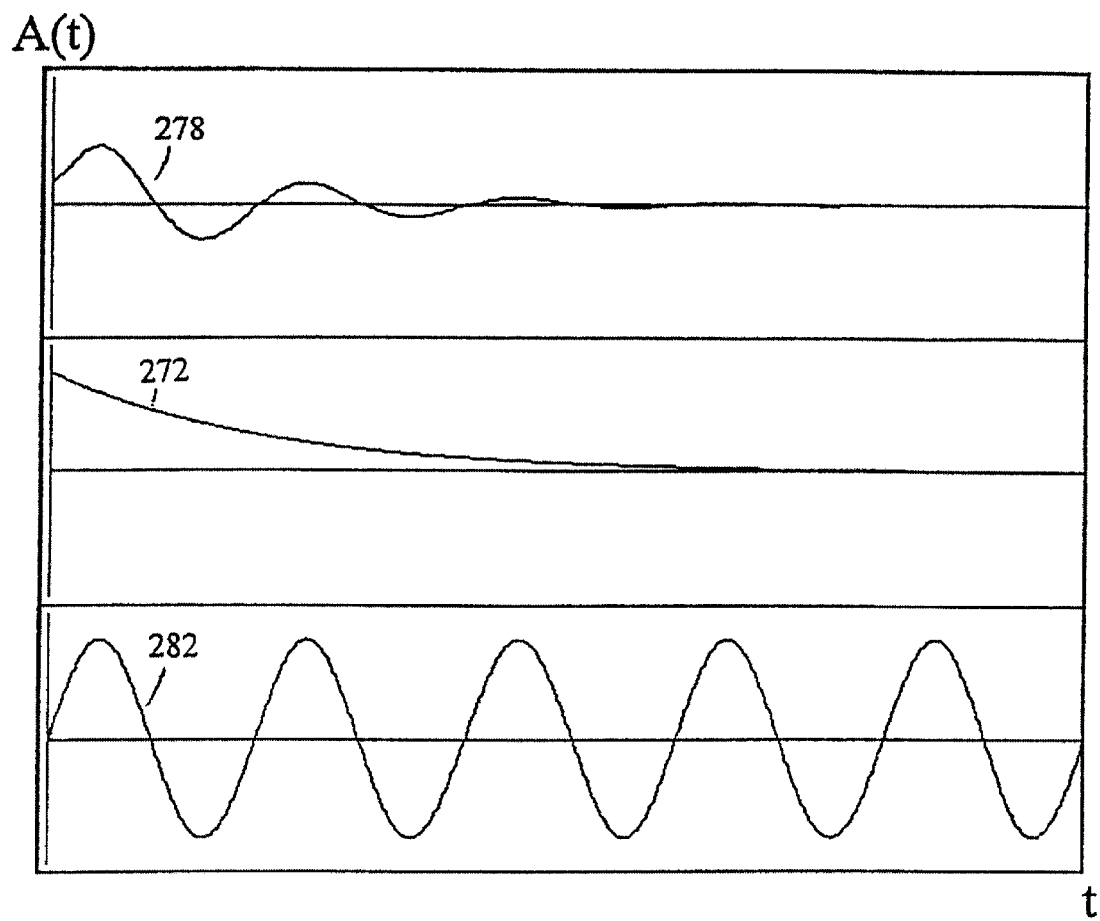

For the Circuit in FIG. 10 it is desired to multiply an analog signal with a SDM signal. The meaning of numbers in FIG. 10 follows. Sinusoidal signal from $x(t)$ (280) is fed via line 282 into DSM (284). Output of DSM (line 286) is multiplied with an exponential signal from $h(t)$ (270) which is fed into the DSW multiplier (274) via line 272. The output of the DSW multiplier (line 273) is fed into low pass filter (276) which outputs circuit signal (line 278). FIG. 10a is a plot of the input signals 282 and 272 and the output signal 278.

Figure 11:
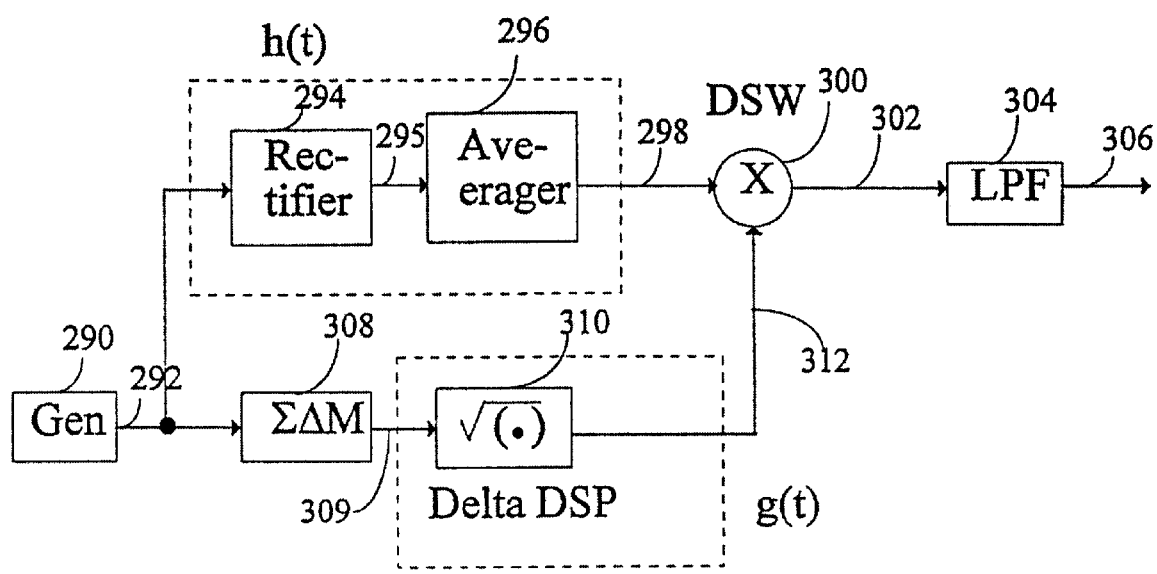
Figure 11A:
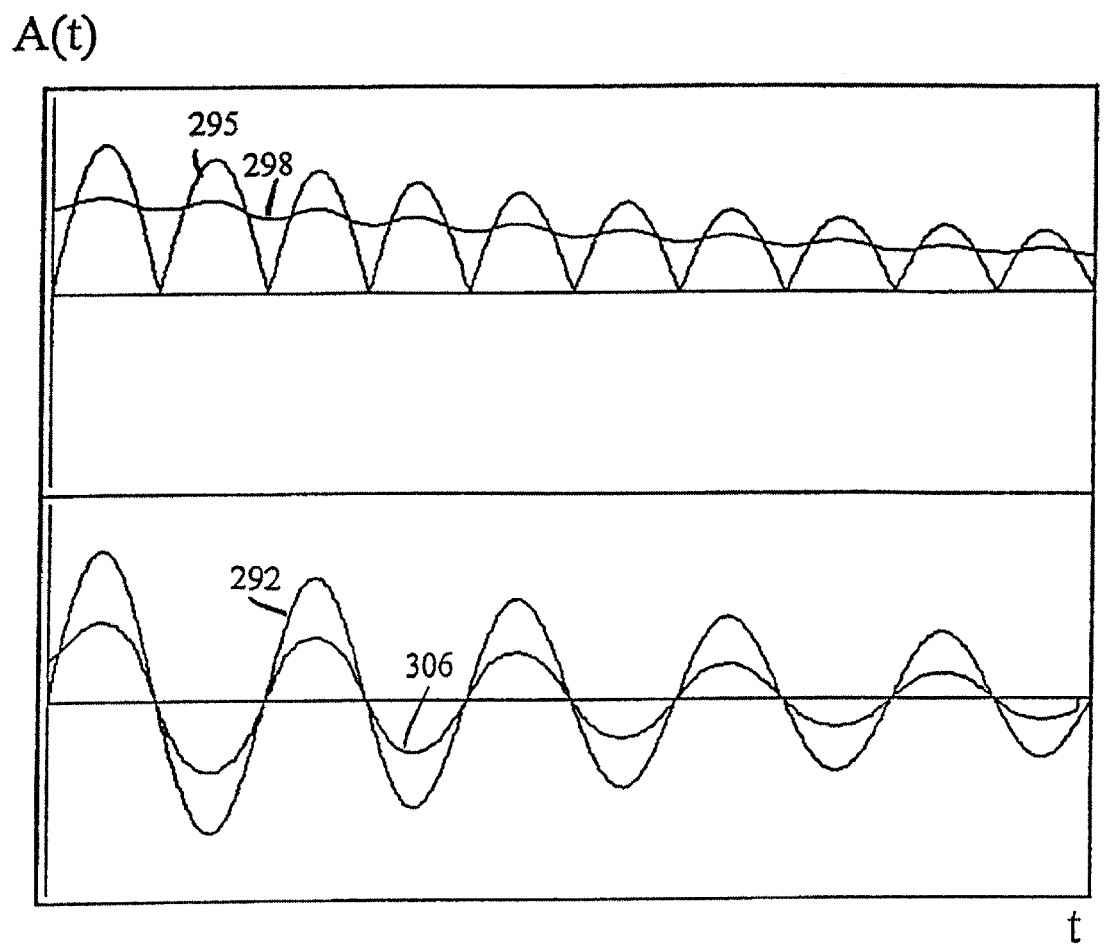

In the circuit of FIG. 11, an analog signal is to be compressed using mixed analog digital processing. The meaning of numbers in FIG. 11 follows. A Function generator (290) produces an exponentially decaying sinusoid (line 292) which is fed into a rectifier (294) and A/D converted in SDM (308). The output of the SDM (309) is fed into delta DSP block (310) whose output is signal 312. The rectifier output (line 295) is fed into Averager (296). Output of averager (298) is fed into DSW multiplier (300) along with signal 312. After low pass filtering of signal 302, compressed signal 306 results. FIG. 11a is a plot of signals 295, 298, 292 and 306.

Figure 12:
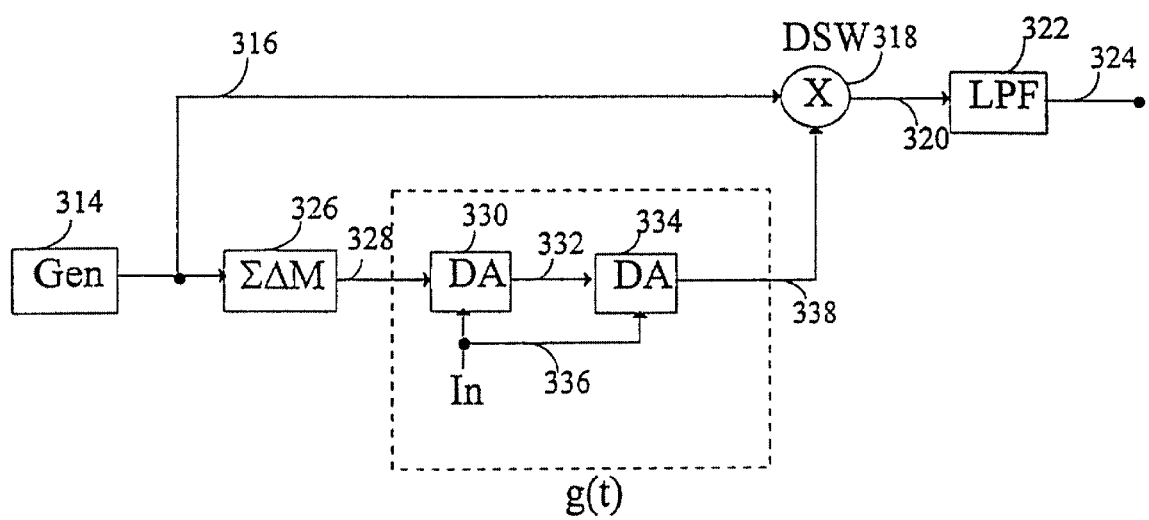

The circuit in FIG. 12 is another mixed analog/digital processor. This is an example of a frequency doubler with amplitude scaling performed on a SDM (326) signal (line 328) in blocks 330 and 334. An idle sequence (336) is fed into second inputs of both Delta Adders (DA). Line 332 connects the output of the first DA (330) to the first input of the second DA (334). A Scaled digital output (338) is fed into DSW multiplier (318) along with analog signal (316) which comes from a generator (314). Multiplied signal (line 320) is low pass filtered (322) and a filtered output is on line 324. FIG. 12a is a plot of signals 316 and 324.

Figure 13:
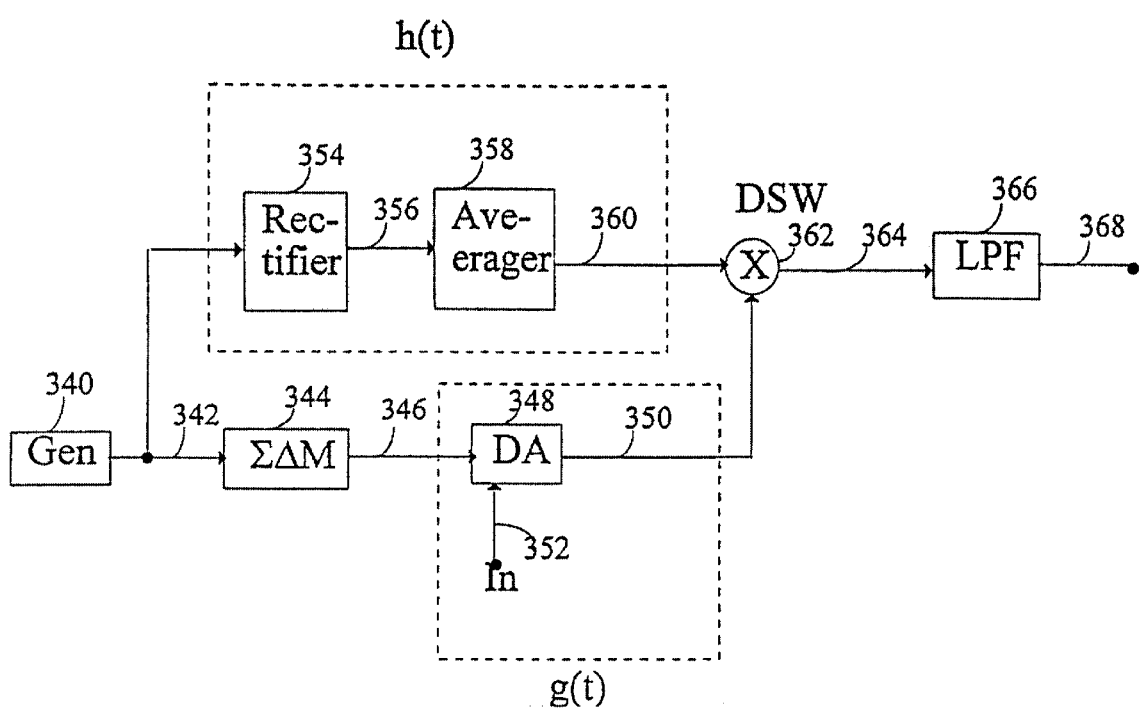
Figure 13A:
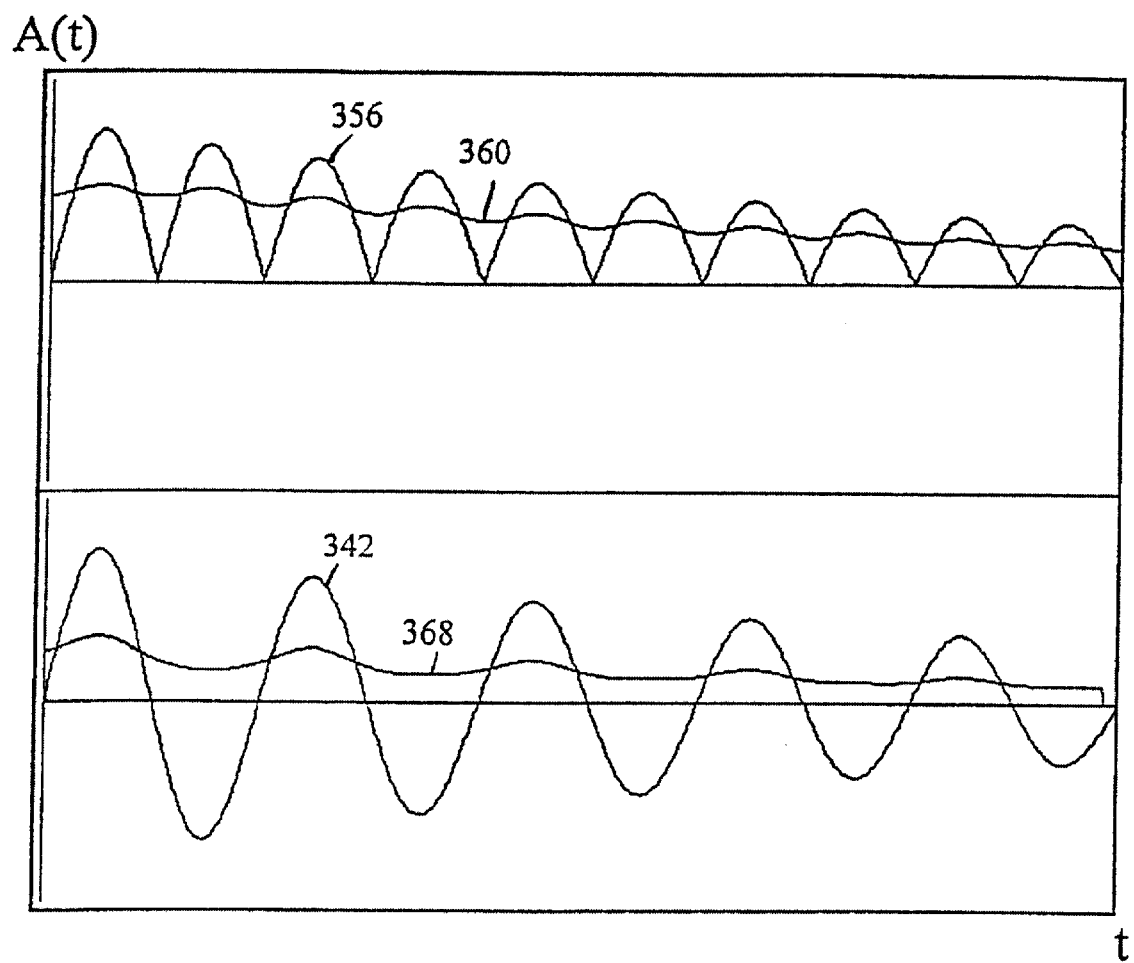
Figure 14:
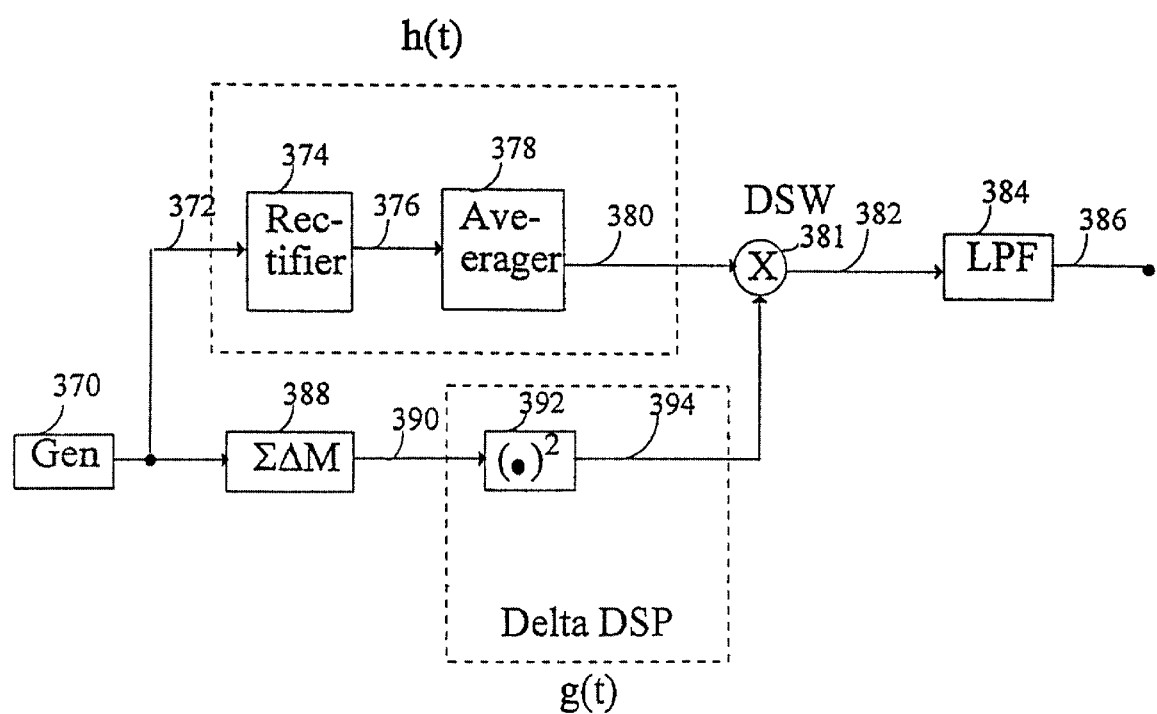

Yet another two examples of mixed analog/digital processors are shown in FIG. 13 and FIG. 14. Signal on line 356 in FIG. 13 represents a rectified analog input signal (342). Signal on line 360 is an averaged signal of input (line 356). DA (348) introduces attenuation of 0.5 and resulting signal is on line 350. After multiplication of signals 360 and 350, signal 364 results. Signal 368 is the filtered output seen in FIG. 13a.

Figure 14A:
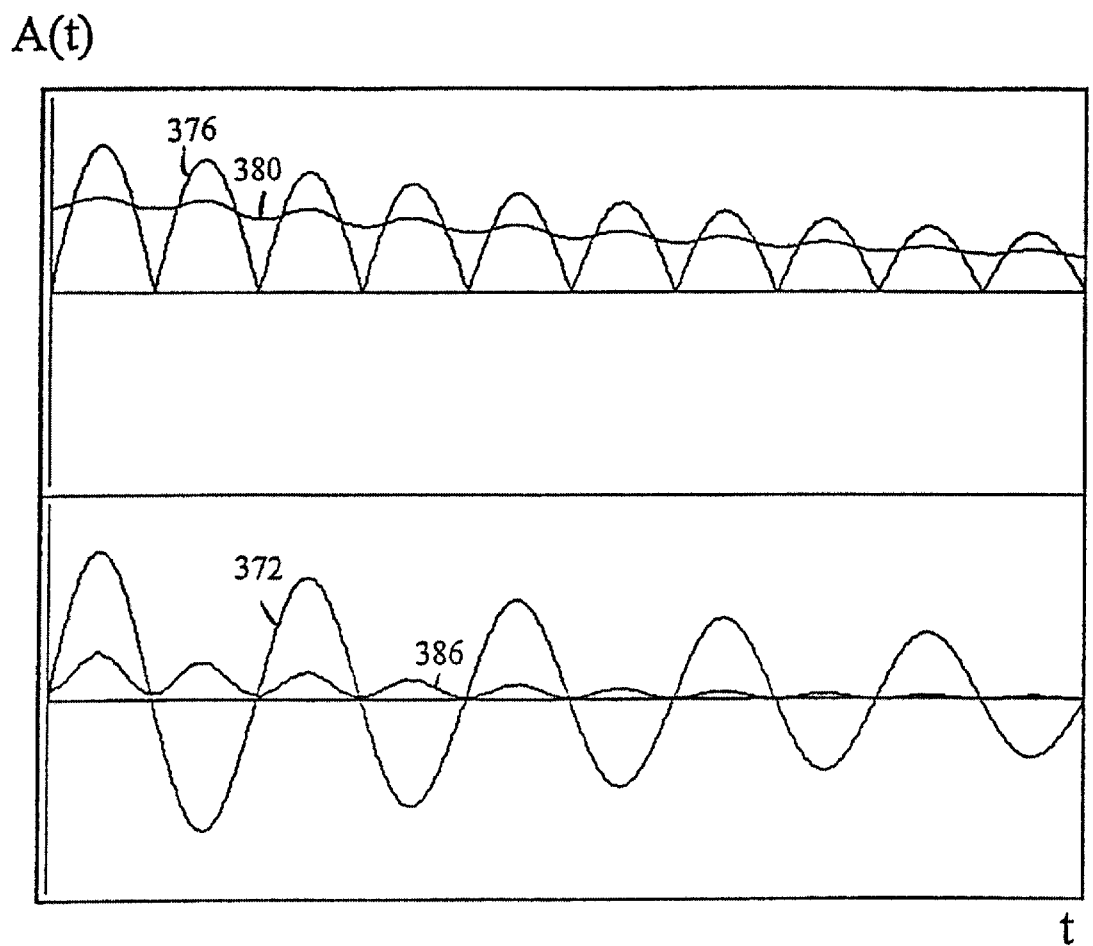

FIG. 14 presents an additional example of mixed analog/digital nonlinear processing. FIG. 14a is a plot of the relevant waveforms from FIG. 14.

Figure 15:
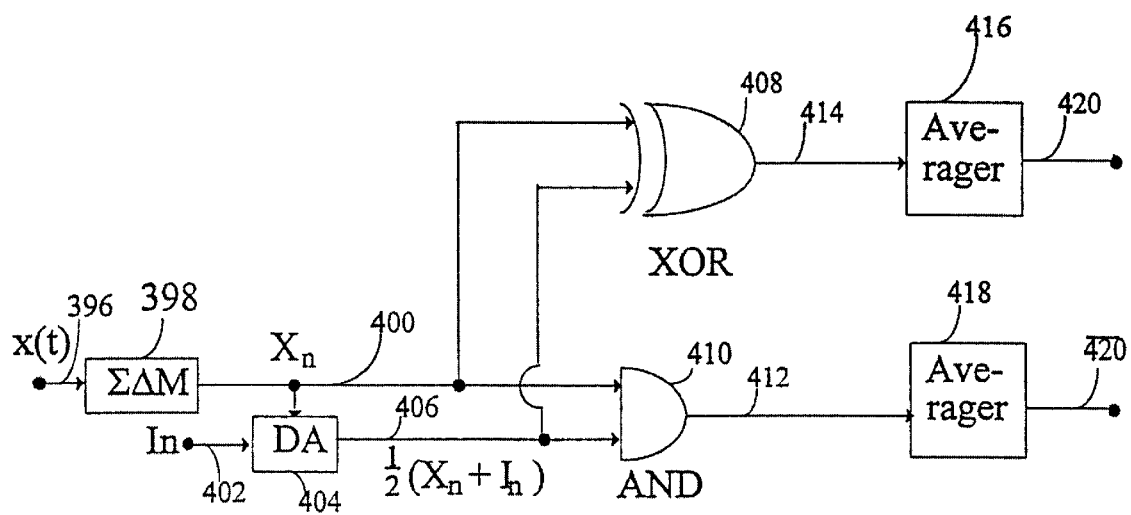
FIG. 15, FIG. 15a, and FIG. 15b present examples to show that an AND gate connected in a prior art manner, such as that shown by Kikkert, is not suitable for use as a multiplying circuit of two SDM sequences in the manner employed by the invention.
Figure 15A:
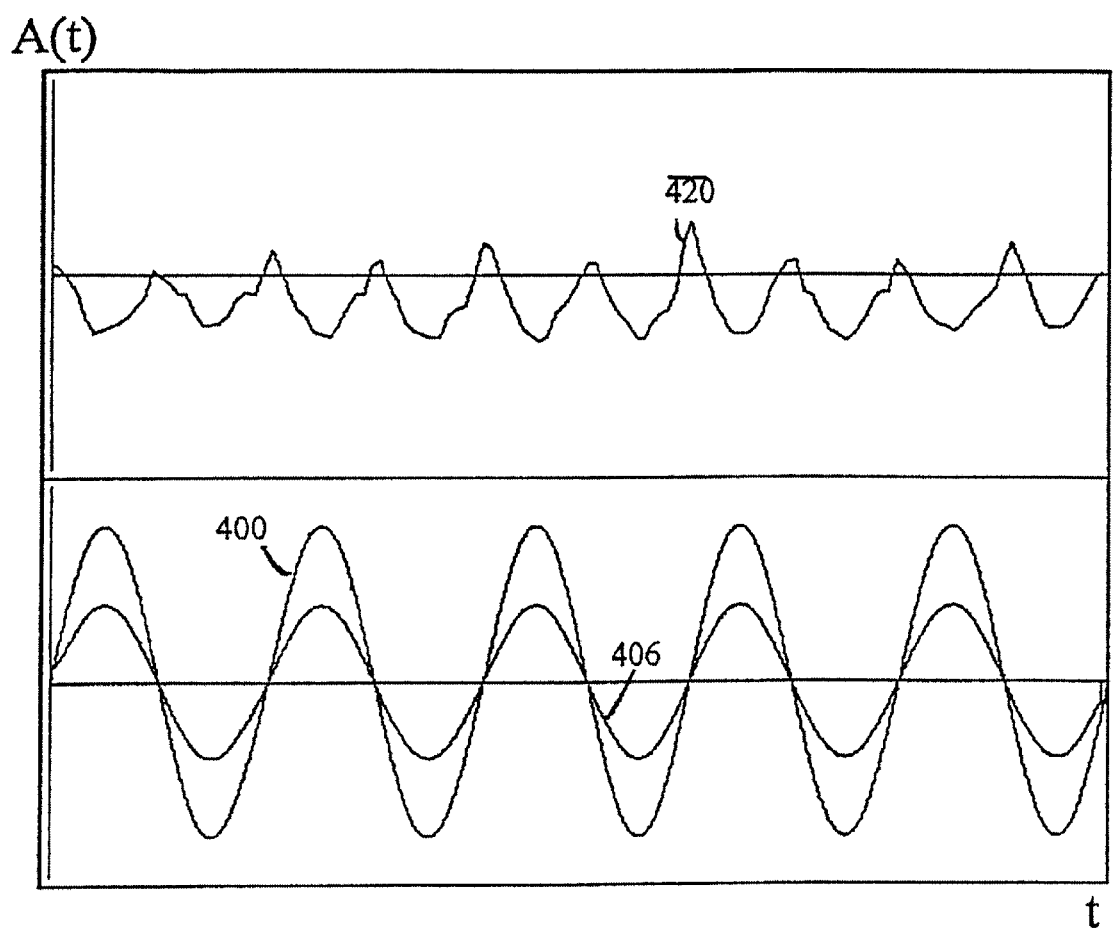
Figure 15B:
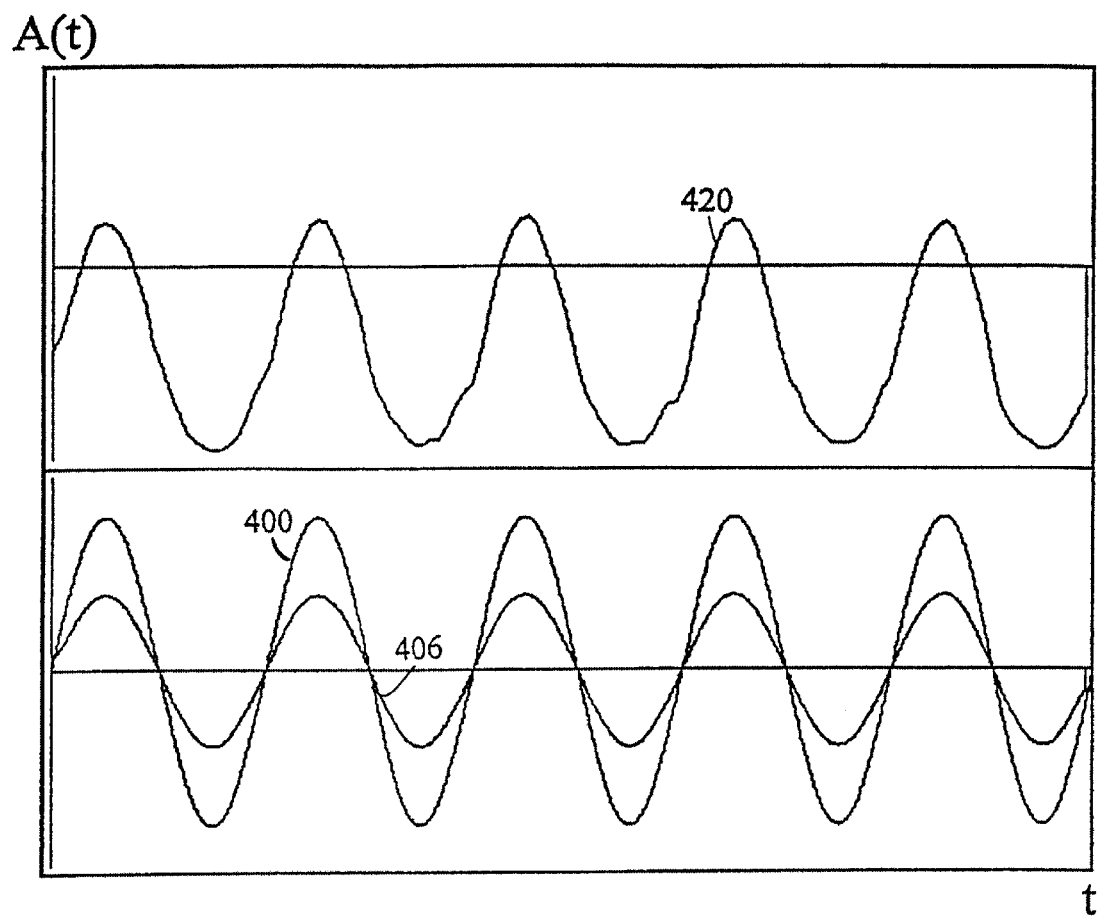

AND and XOR gates are used as multipliers of Sigma Delta Modulator sequences by many others, such as Kikkert. It should be pointed out that it is not possible to use AND or XOR gates as multipliers of two Sigma Delta Modulator sequences in the circuits proposed herein, such as to multiply signals 400 and 406 in FIG. 15. The same software was used to generate the results described above with respect to the embodiments of my invention. In FIG. 15a a filtered output 420 is shown when an AND gate is used as a multiplier, and in FIG. 15b a filtered output 420 is shown when an XOR gate is used as a multiplier. It can be seen, therefore, that compared to the results obtained by my circuits above described, that the outputs of the circuit of FIG. 15 are unsatisfactory.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A signal processor, comprising:

a Delta Adder (DA) for receiving digital Delta Modulated signals, $X_n$ and $Y_n$, and for producing a pulse density digital output signal, $S_n$, representing a digital sum of the modulated inputs, $X_n$, and $Y_n$;

a shift register connected to receive said pulse density digital stream, $S_n$, to memorize a past of the signal $S_n$;

a programmable detection logic circuit connected to receive outputs of said shift register to form a pulse density stream, $F(\cdot)$;

a binary full-adder connected to receive the pulse density stream, $F(\cdot)$, and an output from a binary multiplier to add said pulse density stream, $F(\cdot)$, and said output from the binary multiplier to produce a binary output, $E_{n+1}$;

a D flip-flop to receive the binary signals $E_{n+1}$ and to produce an output, $E_n$;

a binary multiplier to multiply said output $E_n$ produced by D flip-flop and constant (1−L), wherein L is a scaling constant which depends on the function to be realized and the length of the shift register;

and a low pass filter connected to receive the binary signal $E_{n+1}$ to produce a predetermined output function f(x,y).

2. The signal processor of claim 1 wherein said Delta Digital Signal Processor (Delta DSP) is configured to handle at least two synchronous delta modulated pulse streams.

3. The signal processor of claim 2 wherein said Delta DSP is configured to multiply the input signal by a constant, $Y_n$, when the second input is zero.

4. The signal processor of claim 3 wherein said constant, $Y_n$, is an idle sequence, $I_n$, wherein $I_n = \ldots -1,+1,-1,+1,\ldots$.

5. The signal processor of claim 2 wherein said Delta DSP is configured to handle more than two input sequences when one or both inputs are outputs of two input Delta Adders (DA).

6. The signal processor of claim 2 wherein said Delta DSP is capable of performing linear arithmetic operations on pulse density stream, $S_n$, to realize a desired function f(x,y).

7. The signal processor of claim 2 wherein said Delta DSP is configured to perform nonlinear arithmetic operation on the pulse density stream, $S_n$, to realize a desired function f(x,y).

8. A mixed analog digital processor, comprising:

a sigma delta modulator (SDM) to receive an analog input, $x_n$, to encode said analog input, $x_n$, and to produce a pulse density output, $X_n$;

a digital inverter connected to produce a digital inverted signal of $X_n$;

an analog inverter connected to produce an analog inverted signal of $X_n$;

a pair of switches SW1 and SW2 each having a first input, respectively connected to receive said analog input, $x_n$, and said analog inverted signal of $x_n$, each of said switches respectively receiving on a second input said pulse density output, $X_n$, and said a digital inverted signal of $X_n$;

and said pair of switches SW1 and SW2 having outputs interconnected to produce an AM modulated output.

9. The mixed analog digital processor of claim 8 further comprising a low pass filter receiving said AM modulated output to provide an output signal having a doubled frequency from said analog input.

10. The mixed analog digital processor of claim 8 wherein said second input is a switch control input.

* * * * *